US008676465B2

(12) United States Patent
Oshima et al.

(10) Patent No.: US 8,676,465 B2
(45) Date of Patent: Mar. 18, 2014

(54) SLIP SUPPRESSION CONTROL SYSTEM FOR VEHICLE

(75) Inventors: Takeru Oshima, Kobe (JP); Tatsuya Hirokami, Osaka (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 346 days.

(21) Appl. No.: 12/491,387

(22) Filed: Jun. 25, 2009

(65) Prior Publication Data

US 2009/0326777 A1 Dec. 31, 2009

(30) Foreign Application Priority Data

Jun. 26, 2008 (JP) ................................. 2008-166941
Jun. 18, 2009 (JP) ................................. 2009-144999
Jun. 18, 2009 (JP) ................................. 2009-145001

(51) Int. Cl.
*B60T 7/12* (2006.01)
*G05D 1/00* (2006.01)
*G06F 7/00* (2006.01)
*G06F 17/00* (2006.01)

(52) U.S. Cl.
USPC .................. 701/90; 701/70; 701/82; 701/84; 303/163

(58) Field of Classification Search
USPC ............ 701/70, 82, 84, 86, 90, 110; 303/137, 303/139, 141, 142, 145, 151, 163; 123/305, 123/329, 334, 339.11, 406.11, 406.12, 123/406.19, 406.5, 406.51
See application file for complete search history.

(56) References Cited

U.S. PATENT DOCUMENTS

| 4,955,448 | A | 9/1990 | Ise et al. |
| 5,241,478 | A | 8/1993 | Inoue et al. |
| 5,291,408 | A | 3/1994 | Thatcher |
| 5,544,949 | A | 8/1996 | Schmitt et al. |
| 5,593,217 | A | 1/1997 | Schmitt et al. |
| 7,853,389 | B2 * | 12/2010 | Luehrsen et al. ............... 701/82 |
| 2007/0010929 | A1 | 1/2007 | Takeda et al. |
| 2008/0105479 | A1 * | 5/2008 | Nishiike et al. ............... 180/197 |

FOREIGN PATENT DOCUMENTS

| DE | 4205068 A1 | 9/1992 |
| DE | 4433459 A1 | 3/1996 |
| DE | 4433460 A1 | 3/1996 |
| DE | 102005012775 A1 | 10/2006 |

(Continued)

OTHER PUBLICATIONS

ISA, European Patent Office, Search Report of EP09008165, Sep. 27, 2010, 6 pages.

(Continued)

*Primary Examiner* — Rami Khatib
(74) *Attorney, Agent, or Firm* — Alleman Hall McCoy Russell & Tuttle LLP

(57) ABSTRACT

A slip suppression control system for a vehicle includes a monitored value detecting device for detecting a monitored value corresponding to a difference between a rotational speed of a front wheel and a rear wheel, and a traction control unit configured to initiate initial traction control for reducing a driving power of a drive wheel when a threshold determiner unit determines that the monitored value exceeds a first slip threshold and to execute continued traction control such that the driving power is reduced when the threshold determiner unit determines that the monitored value exceeds a second slip threshold smaller than the first slip threshold, while the driving power is increased when the threshold determiner unit determines that the monitored value is smaller than a gripping threshold which is the second slip threshold or smaller.

29 Claims, 31 Drawing Sheets

(56) References Cited

FOREIGN PATENT DOCUMENTS

| | | |
|---|---|---|
| DE | 102005035302 A1 | 2/2007 |
| EP | 0449118 A2 | 10/1991 |
| EP | 0336442 A2 | 10/1998 |
| EP | 0338538 A2 | 10/1998 |
| EP | 1908658 A1 | 4/2008 |
| JP | 62203939 A | 9/1987 |
| JP | 03202641 A | 9/1991 |
| JP | 04059437 A | 2/1992 |
| JP | 04072445 A | 3/1992 |
| JP | 05099012 A | 4/1993 |
| JP | 05229417 A | 9/1993 |
| JP | 05231207 A | 9/1993 |
| JP | 05296076 A | 11/1993 |
| JP | 06229361 A | 8/1994 |
| JP | 07-103009 | 4/1995 |
| JP | 7269385 A | 10/1995 |
| JP | 10026034 A | 1/1998 |
| JP | 11006450 A | 1/1999 |
| JP | 2002347477 A | 12/2002 |

OTHER PUBLICATIONS

ISA, European Patent Office, Search Report of EP09008163, Sep. 27, 2010, 6 pages.
ISA, European Patent Office, Search Report of EP09008164, Sep. 27, 2010, 8 pages.
ISA, European Patent Office, Search Report of EP09008162 Sep. 27, 2010, 8 pages.
Japan Patent Office, Notice of Reasons for Rejection of JP2009144996, Feb. 15, 2013, 4 pages.
Japan Patent Office, Notice of Reason for Rejection of JP2009144998, Jan. 15, 2013, 6 pages.

* cited by examiner

SLIP SUPPRESSION CONTROL SYSTEM FOR VEHICLE

CROSS REFERENCE TO RELATED APPLICATION

This application claims priority to and the benefit of Japanese Patent Application No. 2008-166941 filed Jun. 26, 2008, Japanese Patent Application No. 2009-145001 filed Jun. 18, 2009 and Japanese Patent Application No. 2009-144999 filed Jun. 18, 2009, the entire disclosure of which are incorporated herein by reference.

BACKGROUND OF THE INVENTION

1. Field of the Invention

The present invention relates to a slip suppression control system for a vehicle which is configured to control a wheel driving power according to a wheel traction state on a road surface.

2. Description of the Related Art

Conventionally, there is proposed a traction controller configured to reduce an engine driving power to restore a drive wheel traction on a road surface (e.g., see Japanese Laid-Open Patent Application Publication No. Hei 7-103009). This controller uses traction control for retarding an ignition timing of the engine with respect to an optimal timing to reduce the driving power if an increase rate of an engine speed exceeds a predetermined start threshold, thus inhibiting a slip.

However, since it is determined whether or not the drive wheel is slipping on the road surface based on an increase rate of an engine speed, a wrong determination occurs, in which the drive wheel is slipping on the road surface if a detected value exceeds a threshold for some reason or other, despite the fact that the vehicle is actually driving stably. To avoid the wrong determination, the threshold may possibly be set larger. In that case, failure to detect a slip occurs, that is, it is determined that no slip occurs despite the fact that the drive wheel is slipping on the road surface. Thus, it is difficult to set the threshold to an optimal value. If the threshold is not a proper value, accuracy of determining a slip is reduced.

SUMMARY OF THE INVENTION

An object of the present invention is to improve accuracy of determining whether or not a wheel slips on a road surface.

A slip suppression control system for a vehicle of the present invention comprises a monitored value detecting device for detecting a monitored value corresponding to a difference between a rotational speed of a front wheel of the vehicle and a rotational speed of a rear wheel of the vehicle; a threshold determiner unit configured to determine a relationship between the monitored value detected by the monitored value detecting device and a threshold; and a traction control unit configured to execute traction control including initial traction control and continued traction control executed continuously after the initial traction control, based on determination of the threshold determiner unit; wherein the traction control unit is configured to initiate the initial traction control for reducing a driving power of a drive wheel when the threshold determiner unit determines that the monitored value exceeds a first slip threshold; and wherein the traction control unit is configured to execute the continued traction control such that the driving power is reduced when the threshold determiner unit determines that the monitored value exceeds a second slip threshold which is smaller than the first slip threshold, while the driving power is increased when the threshold determines that the monitored value is smaller than a gripping threshold which is the second slip threshold or smaller.

In accordance with the configuration, the initial traction control is initiated when the monitored value exceeds the first slip threshold which is larger than the second slip threshold. Therefore, even if the monitored value increases to a value smaller than the first slip threshold for some reason other than the slip, it is possible to avoid wrong determination that a wheel slips on the road surface. In addition, once the initial traction control starts, it is detected whether or not there is a slip based on the second slip threshold which is smaller than the first slip threshold, because in this situation, it may be presumed that the vehicle is likely to slip. In this way, failure to detect a slip is avoided. By avoiding wrong determination and failure to detect the slip in this way, determination accuracy of the slip is improved. The gripping threshold may be equal to the second slip threshold.

The traction control unit may be configured to feedback control the driving power to cause the monitored value to be closer to the second slip threshold in the continued traction control.

In accordance with the configuration, since the monitored value is made closer to the second slip threshold by the feedback control a periodic fluctuation in the monitored value can be reduced.

The traction control unit may be configured to transition the initial traction control to the continued traction control when the threshold determiner unit determines that the monitored value is smaller than a switching threshold which is smaller than the first slip threshold, in a state where the initial traction control is being executed.

In accordance with the configuration, the timing when the initial traction control transitions to the continued traction control is determined based on the monitored value. Therefore, the transition is performed when the difference between the rotational speed of the front wheel and the rotational speed of the rear wheel is an appropriate value. The switching threshold may be equal to the second slip threshold;

The traction control unit may be configured to reduce a reduction rate of the driving power when the threshold determiner unit determines that the monitored value is not larger than a driving power reduction suppression threshold which is smaller than the first slip threshold and larger than the switching threshold.

In accordance with the configuration, by setting the driving power reduction suppression threshold, it is possible to lessen reduction of the driving power immediately before transition from the initial traction control to the continued traction control and to inhibit that the initial traction control transitions to the continued traction control in a state where the diving power is excessively reduced. For example, when there is an operation delay from when a command for changing the driving power is input until the driving power is actually changed, it is possible to suitably inhibit that the driving power is reduced excessively.

At least one of the first slip threshold and the second slip threshold may be changed according to a driving state of the vehicle.

In accordance with the configuration, since the slip threshold is set appropriately according to the driving state, it is determined appropriately whether or not a slip occurs according to the driving state, regardless of the difference in the monitored value at the start of the slip.

At least one of the first slip threshold and the second slip threshold may be changed according to a driver's operation.

In accordance with the configuration, since the magnitude of the slip threshold is decided according to the driver's intention the operation of the traction control can be changed according to the driving state. For example, the second slip threshold may be set to increase as the amount of the driver's operation for opening the throttle valve increases. Thus, a driving state according to the driver's preference is attainable, because some drivers prefer to enjoy driving while permitting a slip.

The slip suppression control system for a vehicle may further comprise an engine which is a driving power generating source; and an igniter for igniting in a cylinder of the engine. The traction control unit may be configured to perform retard control of ignition timing of the igniter to reduce the driving power.

In accordance with the configuration, by retarding the ignition timing, the driving power of the wheel can be reduced in a relatively short time.

The slip suppression control system for a vehicle may further comprise an engine which is a driving power generating source; and a throttle device configured to control an amount of air-intake supplied to the engine. The traction control unit may be configured to control the throttle device to reduce the amount of air-intake to reduce the driving power.

In accordance with the configuration, by reducing the air-intake amount, the driving power of the wheel can be reduced easily irrespective of the ignition timing. For example, by reducing the air-intake amount, the driving power can be reduced, in a state where the ignition timing is maintained at proper ignition timing set in the normal state.

The slip suppression control system for a vehicle may further comprise a brake for braking a drive wheel; and a brake actuator for actuating the brake. The traction control unit may be configured to control the brake actuator to activate the brake when the threshold determiner unit determines that the monitored value exceeds the first slip threshold.

In accordance with the configuration, the driving power can be reduced significantly by directly reducing the driving power at the time point of start of a slip when the monitored value exceeds the first slip threshold. Thus, it is possible to quickly restore the state from a slip state.

The traction control unit may be configured to terminate the traction control to return the traction control to a normal control state when a predetermined restoration condition is satisfied; and the restoration condition may be a condition that a driving power in a state where the traction control is being executed matches a driving power set in the normal control state.

In accordance with the configuration, a change in the driving state which occurs when the traction control transitions to the normal control state is small. Thus, a good driver's feeling can be maintained.

The restoration condition may be a condition that a state where a driving power under the continued traction control matches a driving power set in the normal state continues for a predetermined time or longer. The restoration condition may be set to a condition with which it is determined that there is little chance for a slip in the continued traction control. For example, the restoration condition may be a condition in which a period when the monitored value is smaller than the second slip threshold continues for a predetermined time. The restoration condition may be according to a driver's command. For example, the restoration condition may be a condition in which the driver gives a traction control OFF command. The restoration condition may be a condition that the driver performs a driving operation, for example, gives a command for fully closing a throttle valve opening degree using an accelerator grip. In a further alternative, the restoration condition may be set to another condition.

The slip suppression control system for a vehicle may further comprise a vehicle speed sensor configured to detect a vehicle body speed. The threshold determiner unit may be configured to change the threshold used in the continued traction control according to a vehicle speed detected by the vehicle speed sensor.

In accordance with the configuration, since the threshold changes according to the vehicle speed, the driving power during the continued traction control can be controlled properly according to the vehicle speed.

The threshold determiner unit may be configured to set so that the threshold is larger than in one vehicle speed detected by the vehicle speed sensor, in another vehicle speed which is higher than the one vehicle speed.

In accordance with the configuration, since the threshold is small during low-speed driving, drive wheel traction on the road surface at the starting or the like can be improved. In addition, since the threshold is large during high-speed driving, the continued traction control is easily terminated, reducing an operation period of the traction control in the high-speed driving.

The slip suppression control system for a vehicle may further comprise a throttle valve opening degree sensor configured to detect an opening degree of a throttle valve for controlling an air-intake amount of an engine. The threshold determiner unit may be configured to change the threshold used in the continued traction control according to the throttle valve opening degree detected by the throttle valve opening degree sensor.

In accordance with the configuration, since the threshold changes according to the throttle valve opening degree, the driving power during the continued traction control can be controlled properly according to the throttle valve opening degree.

The threshold determiner unit may be configured to set so that the threshold is larger than in one throttle valve opening degree detected by the throttle valve opening degree sensor, in another throttle valve opening degree which is detected by the throttle valve opening degree sensor and which is larger than the one throttle valve opening degree.

In accordance with the configuration, since the threshold is small when the throttle valve opening degree is small, drive wheel traction on the road surface in a low acceleration state or the like can be improved. In addition, since the threshold is large when the throttle valve opening degree is large, the continued traction control is easily terminated, reducing an operation period of the traction control in the high acceleration state.

The slip suppression control system for a vehicle may further comprise a throttle valve opening degree sensor configured to detect an opening degree of a throttle valve for controlling an air-intake amount of an engine; wherein the traction control unit is configured to change a feedback gain in the continued traction control according to the throttle valve opening degree detected by the throttle valve opening degree sensor.

In accordance with the configuration, since the feedback gain changes according to the throttle valve opening degree, proper feedback control according to the throttle valve opening degree can be performed in the continued traction control.

The slip suppression control system for a vehicle may further comprise an engine speed sensor configured to detect an engine speed of an engine. The traction control unit may be configured to change a feedback gain in the continued traction control according to the engine speed detected by the engine speed sensor.

In accordance with the configuration, since the feedback gain changes according to the engine speed, proper feedback control according to the engine speed can be performed in the continued traction control.

The traction control unit may contain a lower limit value map used for determining a lower limit value of a parameter corresponding to an engine driving power, in a state where the traction control is being executed.

In accordance with the configuration, since the lower limit value of the parameter corresponding to the engine driving power is set in the state where the traction control is being executed it is possible to avoid an engine stall in the traction control for reducing the driving power.

The parameter may be at least one of an ignition timing of an engine, a throttle valve opening degree, and a fuel feed amount.

The lower limit value map may be set so that a lower limit value of the parameter gradually decreases and ten gradually increases, as the engine speed increases.

In accordance with the configuration, the lower limit value of the parameter is set larger when the engine speed is in a low-speed range, inhibiting an engine stall. The lower limit value of the parameter is set smaller when the engine speed is in a medium speed range, increasing flexibility of setting of the parameter. The lower limit value of the parameter is set larger when the engine speed is in a high-speed range, suppressing a fluctuation in the driving speed when the traction control is initiated.

The slip suppression control system for a vehicle may further comprise an ignition control unit configured to control ignition ting of a cylinder of the engine; and a fuel control unit configured to control an amount of fuel fed to the cylinder. The fuel control unit may be configured to execute cylinder operation pause control in which feeding of the fuel to the cylinder is temporarily paused, when a state where a first condition including a condition that the ignition timing is retarded is satisfied continues for a predetermined time or longer.

In accordance with the configuration, when the state where the ignition tiring is retarded continues for a long time, feeding of the fuel to the cylinder is paused. Therefore, uncombusted gas in the exhaust gas can be reduced, and a catalyst provided in an exhaust system can be protected.

The first condition may include a condition that ignition timing in a state where the traction control is being executed is retarded by a predetermined angle or larger with respect to an ignition timing in a normal control state where the traction control is not executed.

In accordance with the configuration, the start condition for cylinder operation pause control includes a state where the ignition timing is retarded by a predetermined angle or larger as well as the state where the ignition timing is retarded continues for a predetermined time or longer. That is, when the retard angle is small, uncombusted gas reaching the catalyst is relatively less. Therefore, the cylinder operation pause control is not executed even if the time when the ignition timing is retarded is long, maintaining the engine driving power. As a result, the catalyst protection and the engine driving power output performance can be made compatible with each other.

The first condition may include a condition that the engine speed is a first predetermined value or higher.

In accordance with the configuration, the start condition for the cylinder operation pause control includes a state where the engine speed is a predetermined value or larger as well as the state where the ignition timing is retarded continues for a predetermined time or longer. That is, when the engine speed is low, the cylinder operation pause control is not executed even if the ignition timing is retarded for a long time, maintaining the engine driving power. When the engine speed is low, the number of combustion strokes per unit time is reduced and an amount of the exhaust gas is reduced, so that uncombusted gas reaching the catalyst is relatively less. As a result, the catalyst protection and the engine driving power output performance can be made compatible with each other. When the engine speed is low, the cylinder operation pause control is not executed. Thus, degradation of the driving feeling is lessened, and an engine stall is inhibited.

The fuel control unit may be configured to terminate the cylinder operation pause control when a second condition including a condition that the engine speed is lower than a second predetermined value is satisfied in a state where the cylinder operation pause control is being executed.

In accordance with the configuration, when the engine speed decreases in the state where the cylinder operation pause control is being executed, the cylinder operation pause control terminates and the engine driving power increases. When the engine speed is low, the number of combustion strokes per unit time is reduced and the amount of the exhaust gas is reduced, so that uncombusted gas reaching the catalyst is relatively less. As a result the catalyst protection and the engine driving power output performance can be made compatible with each other. When the engine speed reaches a small value, the cylinder operation pause control is terminated, lessening degradation of the driving feeling, and inhibiting an engine stall.

Plural cylinders may be provided. The cylinder operation pause control may be executed for a part of the plural cylinders.

In accordance with the configuration, the catalyst can be protected while maintaining a proper engine driving power for the driving.

The above and further objects and features of the invention will more fully be apparent from the following detailed description with reference to accompanying drawings.

DETAILED DESCRIPTION OF THE PREFERRED EMBODIMENTS

Hereinafter, embodiments of the present invention will be described with reference to the drawings. As used hereinafter, the direction is referenced from the perspective of a driver mounting a motorcycle.

(Embodiment 1)

Figure 1:
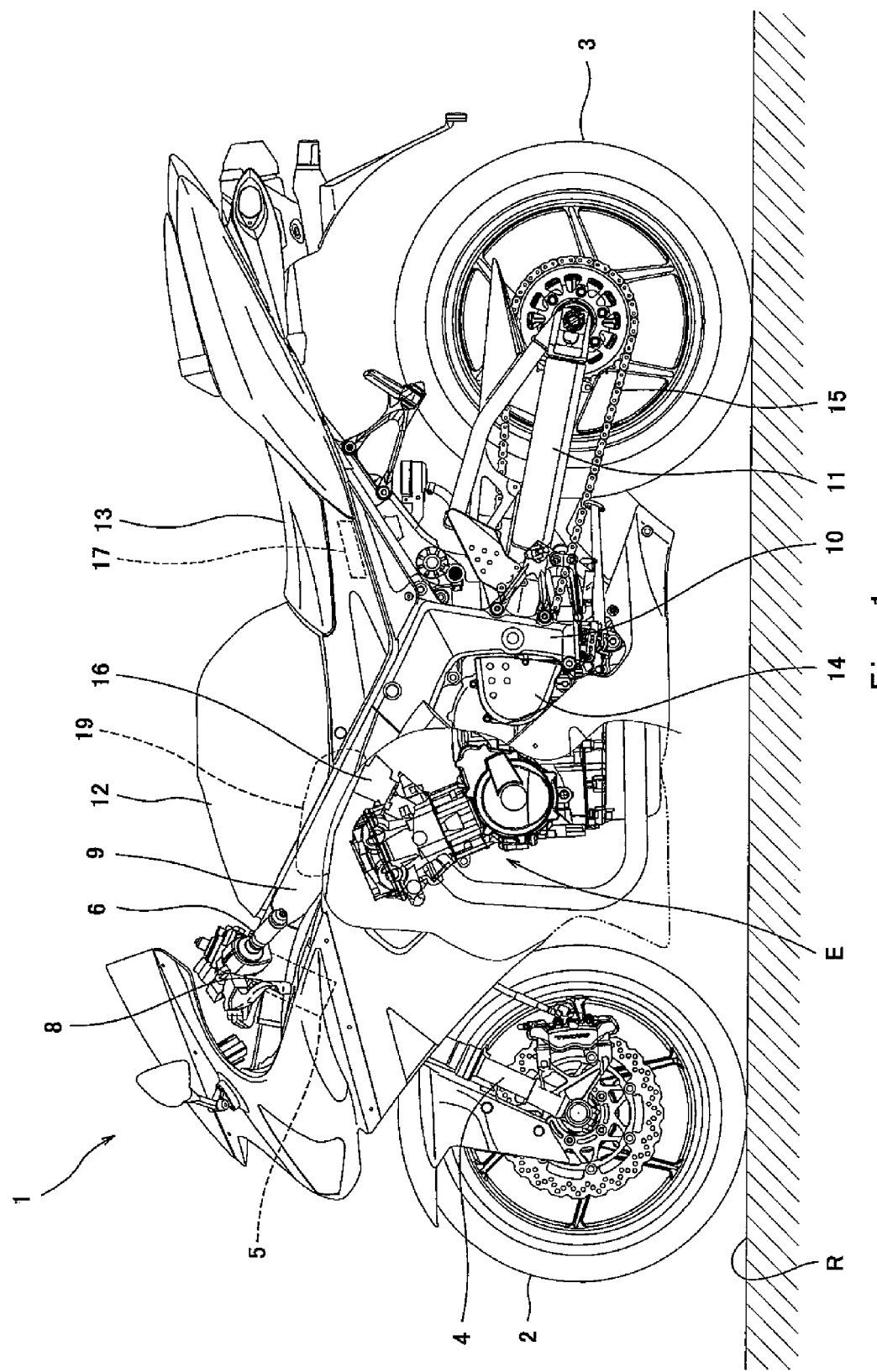
FIG. 1 is a left side view of a motorcycle having a slip suppression function according to Embodiment 1 of the present invention.

FIG. 1 is a left side view of a motorcycle 1 having a slip suppression function according to Embodiment 1 of the present invention. As shown in FIG. 1, the motorcycle 1 (vehicle) includes a front wheel 2 and a rear wheel 3 which roll on a road surface R. The rear wheel 3 is a drive wheel and the front wheel 2 is a driven wheel. The front wheel 2 is rotatably mounted to a lower end portion of a front fork 4 extending substantially vertically. The front fork 4 is mounted to a steering shaft (not shown) via an upper bracket (not shown) provided at the upper end portion thereof and an under bracket (not shown) provided under the upper bracket. The steering shaft is rotatably supported by a head pipe 5. A bar-type handle 6 extending rightward and leftward is mounted to the upper bracket.

A throttle grip 7 (see FIG. 2) of the handle 6 which is gripped by the driver's right hand is a throttle input device which is rotated by a gripping operation of the driver's wrist to operate a throttle device 16 as described later. A clutch lever 8 (clutch input device) is provided in front of a grip of the handle 6 which is gripped by the driver's left hand. The driver rotates the handle 6 to turn the front wheel 2 to a desired direction around the steering shaft which is a rotational shaft.

A pair of main frame members 9 extend rearward from the head pipe 5 such that the main frame members 9 are tilted slightly downward. A pair of pivot frame members 10 are respectively coupled to the rear portions of the main frame members 9. A swing arm 11 is pivotally mounted at a front end portion thereof to each pivot frame 10 so as to extend substantially forward and rearward. The rear wheel 3 is rotatably mounted to the rear end portions of the swing arms 11. A fuel tank 12 is provided behind the handle 6. A seat 13 which is straddled by the driver is provided behind the fuel tank 12.

An inline four-cylinder engine E is disposed between the front wheel 2 and the rear wheel 3 such that the engine E is supported by the main frame members 9 and the pivot frame members 10. A transmission 14 is coupled to the engine E. A driving power output from the transmission 14 is transmitted to the rear wheel 3 via a chain 15. A throttle device 16 is disposed inside the main frame members 9 and is coupled to an intake port (not shown) of the engine E. An air cleaner 19 is disposed below the fuel tank 12 and is coupled to an upstream side of the throttle device 16. In an inner space below the seat 13, an engine ECU 17 (electronic control unit) which is an engine controller configured to control the throttle device 16, an igniter 26 (see FIG. 2), a fuel injector, etc., are accommodated.

Figure 2:
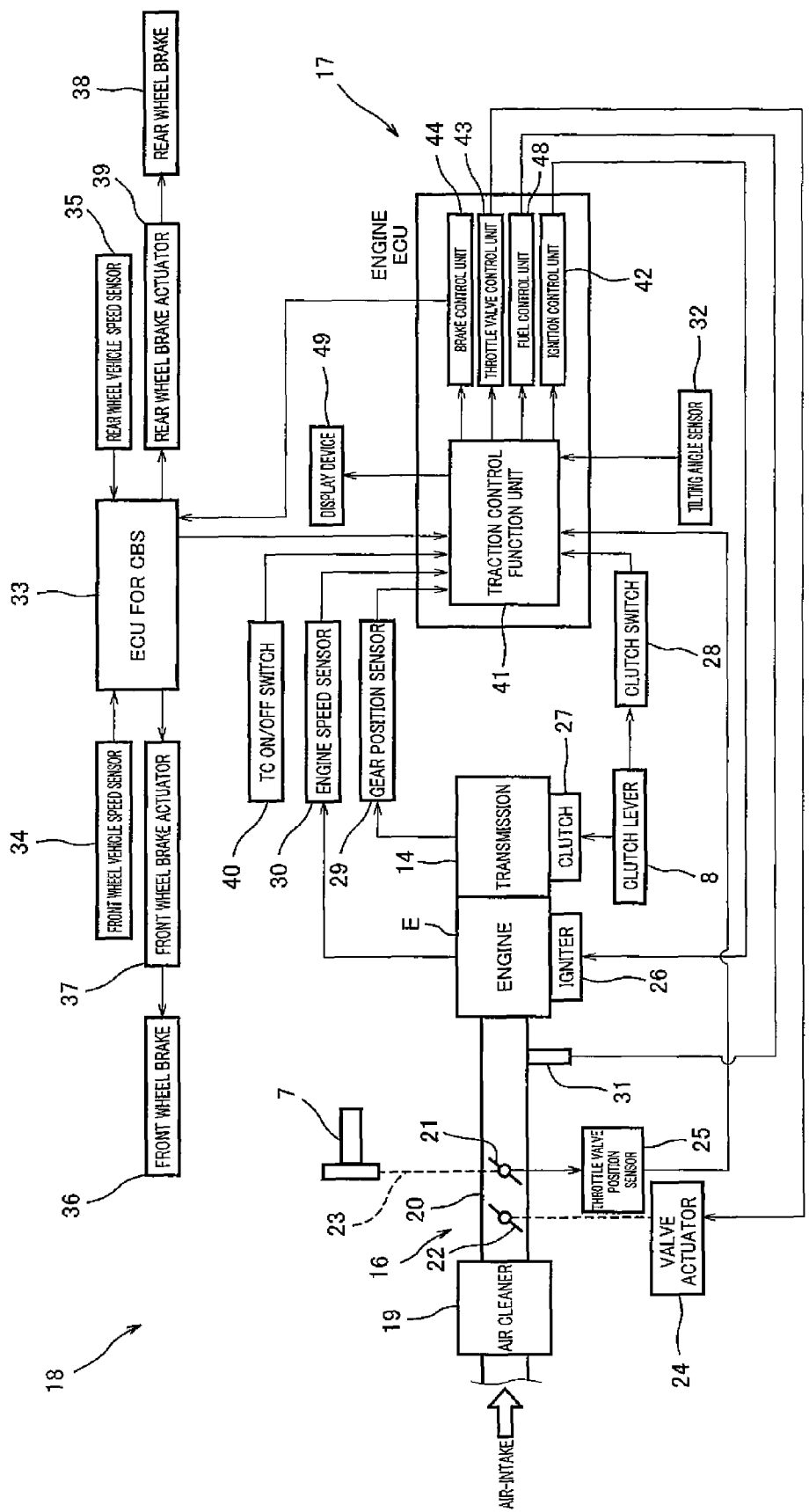
FIG. 2 is a block diagram showing an entire slip suppression control system built into the motorcycle of FIG. 1.

FIG. 2 is a block diagram showing an entire slip suppression control system 18 built into the motorcycle 1 of FIG. 1. As shown in FIG. 2, the slip suppression control system 18 includes the throttle device 16 provided between the air cleaner 19 and the engine E. The throttle device 16 includes an air-intake pipe 20, a main throttle valve 21 disposed at a downstream portion of the air-intake pipe 20, and a sub-throttle valve 22 disposed at an upstream portion of the air-intake pipe 20. The main throttle valve 21 is coupled to the throttle grip 7 via a throttle wire 23. The main throttle valve 21 is configured to open and close in association with the driver's operation of the throttle grip 7. A throttle valve position sensor 25 (throttle valve opening degree sensor) is attached on the main throttle valve 21 to detect the opening degree of the main throttle valve 21. Since the main throttle valve 21 is mechanically operable in association with the throttle grip 7, the throttle valve position sensor 25 serves as a throttle operation amount detecting device which is capable of indirectly detecting the opening degree of the throttle grip 7.

The sub-throttle valve 22 is coupled to a valve actuator 24 constituted by a motor controlled by the engine ECU 17. The sub-throttle valve 22 is driven by the valve actuator 24 to open and close. An injector 31 is provided in the throttle device 16 to inject a fuel to an air-intake passage. The engine E is provided with an igniter 26 for igniting an air-fuel mixture inside four cylinders thereof. A transmission 14 is coupled to the engine E to change a speed of the driving power and transmit it to the rear wheel 3. The transmission 14 is provided with a clutch 27 for enabling/disenabling transmission of the driving power.

The clutch 27 is configured to disenable the transmission of the driving power by the driver's squeezing operation of the clutch lever 8. The clutch lever 8 is provided with a clutch switch 28 (clutch detecting device) which is capable of detecting whether or not the driver is squeezing the clutch lever 8. The transmission 14 is provided with a gear position sensor 29 for detecting a transmission gear position.

The slip suppression control system 18 includes an ECU 33 for CBS for use with a known combined brake system. A front wheel vehicle speed sensor 34 for detecting a vehicle speed from a rotational speed of the front wheel 2 and a rear wheel vehicle speed sensor 35 for detecting a vehicle speed from the rotational speed of the rear wheel 3 are respectively coupled to the ECU 33 for CBS. In addition, a front wheel brake actuator 37 for activating the front wheel brake 36 and a rear wheel brake actuator 39 for activating the rear wheel brake 38 are respectively coupled to the ECU 33 for CBS.

The slip suppression control system 18 further includes a tilting angle sensor 32 for detecting a tilting angle of the vehicle body of the motorcycle 1 in a rightward and leftward direction with respect to a driving direction. The slip suppression control system 18 further includes a traction control ON/OFF switch 40 (ON/OFF input device) with which the driver manually turns ON/OFF a traction control function as described later. That is, the traction control ON/OFF switch 40 is a switch for switching between a permission state in which the traction control is enabled and an inhibiting state in which the traction control is disenabled. The traction control ON/OFF switch 40 is provided at a left end portion of the handle 6 and positioned at an opposite side of the throttle grip 7 provided at a right side portion of the handle 6 in the width direction of the vehicle body such that the traction control ON/OFF switch 40 is distant from the throttle grip 7.

The traction control ON/OFF switch 40 may be configured to be pressed by a press button for a long time to generate an ON/OFF input command. To be more specific, the traction control ON/OFF switch 40 may be configured to generate the ON/OFF command only when the press time (time that lapses from when the switch 40 starts to be pressed until it is released) falls within a predetermined time range (e.g., 1 to 3 seconds) in which an upper limit value and a lower limit value are set. This is because it may be presumed that something inadvertently touches the switch 40 if the press time is shorter than the predetermined time range, while something inadvertently continues to touch the switch 40 if the press time is longer than the predetermined time range.

If the ON/OFF input command has been generated and a first condition including a condition that the traction control is being executed is not satisfied, a traction state (permission state or inhibiting state) before generation of the ON/OFF input command is switched. For example, if the traction state is the permission state before generation of the ON/OFF input command, it is switched to the inhibiting state, whereas if the traction state is the inhibiting state before generation of the ON/OFF input command, it is switched to the permission state. A display device 49 described later changes a display configuration according to the traction state. This enables the driver to check the display state to check a current traction state.

The throttle valve position sensor 25, the clutch switch 28, the gear position sensor 29, the engine speed sensor 30, the tilting angle sensor 32, the ECU 33 for CBS, the traction control ON/OFF switch 40, and the display device 49 are respectively coupled to the ECU 17. The ECU 17 includes at a traction control function unit 41, an ignition control unit 42, a fuel control unit 48, a throttle valve control unit 43, and a brake control unit 44. As described later, the traction control function unit 41 performs calculation relating to the traction control based on the signals received as inputs from the sensors 25, 29, 30, 32, 33, and 40 and the switches 28 and 40. The traction control function unit 41 outputs to the display device 49, which is an LED lamp, etc., a signal to display a control state to the driver. The ignition control unit 42 controls the igniter 26 based on a calculation result of the traction control function unit 41. The fuel control unit 48 controls the injector 31 based on the calculation result of the traction control function unit 41. The throttle valve control unit 43 drives the valve actuator 24 based on the calculation result of the traction control function unit 41 to control the opening degree of the sub-throttle valve 22. The brake control unit 44 outputs a brake activation signal to the ECU 33 for CBS based on the calculation result of the traction control function unit 41.

Figure 3:
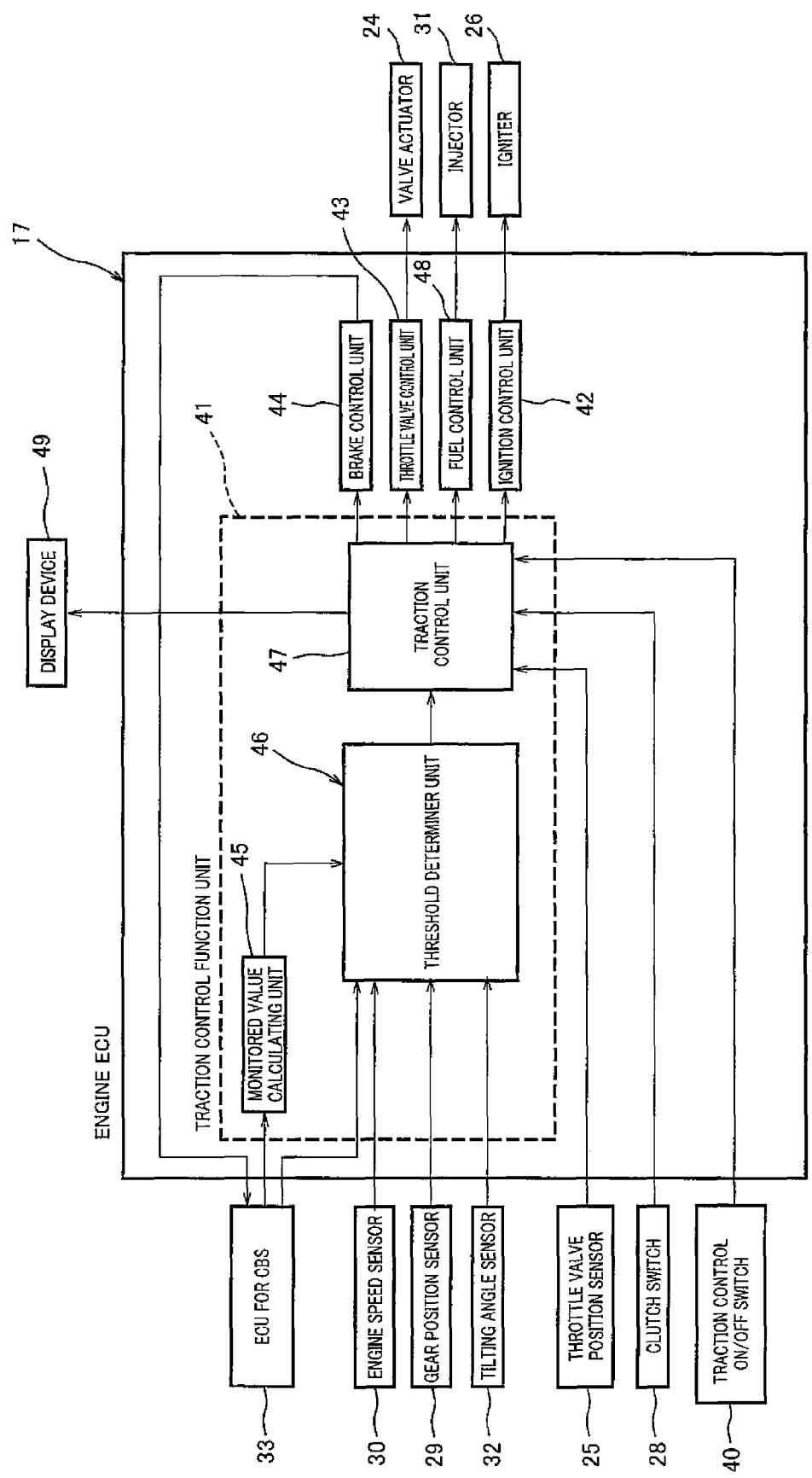
FIG. 3 is a block diagram of major components, chiefly showing an engine ECU of the slip suppression control system of FIG. 2.

FIG. 3 is a block diagram of major components, chiefly showing the engine ECU 17 of the slip suppression control system 18 of FIG. 3. As shown in FIG. 3, the engine ECU 17 includes the traction control function unit 41, the ignition control unit 42, the fuel control unit 48, the throttle valve control unit 43 and the brake control unit 44, as described above. The traction control function unit 41 includes a monitored value calculating unit 45, a threshold determiner unit 46 and a traction control unit 47. The monitored value calculating unit 45 successively calculates as a monitored value M a slip rate which is a value corresponding to the difference between the rotational speed of the front wheel 2 and the rotational speed of the rear wheel 3, based on the information received from the ECU 33 for CBS. To be specific, when the front wheel vehicle speed (circumferential velocity) obtained from the front wheel rotational speed by the front wheel vehicle speed sensor 34 is $V_F$ and the rear wheel vehicle speed (circumferential velocity) obtained from the rear wheel rotational speed by the rear wheel vehicle speed sensor 35 is $V_R$, the monitored value M is calculated according to a formula 1 as follows:

$$M=(V_R-V_F)/V_F \quad \text{[Formula 1]}$$

A monitored value detecting device for detecting the monitored value M is constituted by the front wheel vehicle speed sensor 34, the rear wheel vehicle speed sensor 35, the ECU 33 for CBS and the monitored value calculating unit 45. Whereas the slip rate is used as the monitored value M, the monitored value M is not limited to the value of the formula 1 but may be a value which changes according to a difference between the rotational speed of the front wheel and the rotational speed of the rear wheel. For example, the monitored value M may be a vehicle speed difference ($V_R-V_F$) between the front wheel and the rear wheel, a rotational speed difference between the front wheel and the rear wheel, or an absolute value obtained by dividing the difference between the rotational speed of the front wheel and the rotational speed of the rear wheel by the rotational speed of the front wheel.

The threshold determiner unit 46 determines that the rear wheel 3 has slipped on the road surface R if the monitored value M exceeds a first slip threshold $M_1$. The threshold determiner unit 46 determines that initial traction control should transition to continued traction control if the monitored value M becomes smaller than a second slip threshold $M_2$ (switching threshold). The threshold determiner unit 46 determines that the rear wheel 3 has gripped the road surface R if the monitored value M becomes smaller than the second slip threshold $M_2$ (gripping threshold). The second slip threshold $M_2$ is a value smaller than the first slip threshold $M_1$.

The threshold determiner unit 46 determines that the rear wheel 3 has slipped on the road surface R if the monitored value M exceeds the second slip threshold $M_2$. The threshold determiner unit 46 determines that the rear wheel 3 has slipped on the road surface R during starting if the monitored value M exceeds a starting slip threshold $M_{ST}$. The staring slip threshold $M_{ST}$ is a value smaller than the first slip threshold $M_1$ and larger than the second slip threshold $M_1$. The threshold determiner unit 46 determines that a brake operation should be deactivated as described later if the monitored value M becomes smaller than a brake deactivation threshold $M_B$. The brake deactivation threshold $M_B$ is a value smaller than the first slip threshold $M_1$, larger than the second slip threshold $M_2$ and larger than the starting slip threshold $M_{ST}$.

Whereas in this embodiment the second slip threshold $M_2$ is also used as the gripping threshold, a value smaller than the second slip threshold $M_2$ may be set as the gripping threshold separately from the second threshold $M_2$. In addition, whereas in this embodiment the second slip threshold $M_2$ is also used as the switching threshold, a value which is smaller than the first slip threshold $M_1$ and larger than the second slip threshold $M_2$ may be set as the switching threshold separately from the second threshold $M_2$.

As used herein, the term "slip" refers to a state where the rear wheel 3 moves a predetermined amount or larger with respect to the road surface R and is spinning in a contact region where the rear wheel 3 and the road surface R are in contact. Also, as used herein the term "traction" refers to a state where the rear wheel 3 moves a predetermined amount or smaller with respect to the road surface R and the rear wheel 3 is gripping the road surface R. If a difference generated between the rotational speed of the front wheel 2 and the rotational speed of the rear wheel 3 is small, the rear wheel 3 is in a traction state.

As described later, the traction control unit 47 uses the traction control including the initial traction control for reducing a driving power of the rear wheel 3 and the continued traction control which continuously follows the initial traction control, based on a determination result of the determiner unit 46. To be specific, the traction control unit 47 controls the igniter 26, the injector 31, the valve actuator 24 and the rear wheel brake actuator 39 based on the determination result of the determiner unit 46, to determine a retard angle amount of ignition timing, a fuel injection amount, a reduction amount of air-intake and the operation of the rear wheel brake 38, respectively. The ignition control unit 42 controls the igniter 26 in accordance with a command from the traction control unit 47, the fuel control unit 48 controls the injector 31 in accordance with a command from the traction control unit 47, the throttle valve control unit 43 controls the valve actuator 24 in accordance with a command from the traction control unit 47, and the brake control unit 44 controls the rear wheel brake 38 in accordance with a command from the traction control unit 47.

Figure 4:
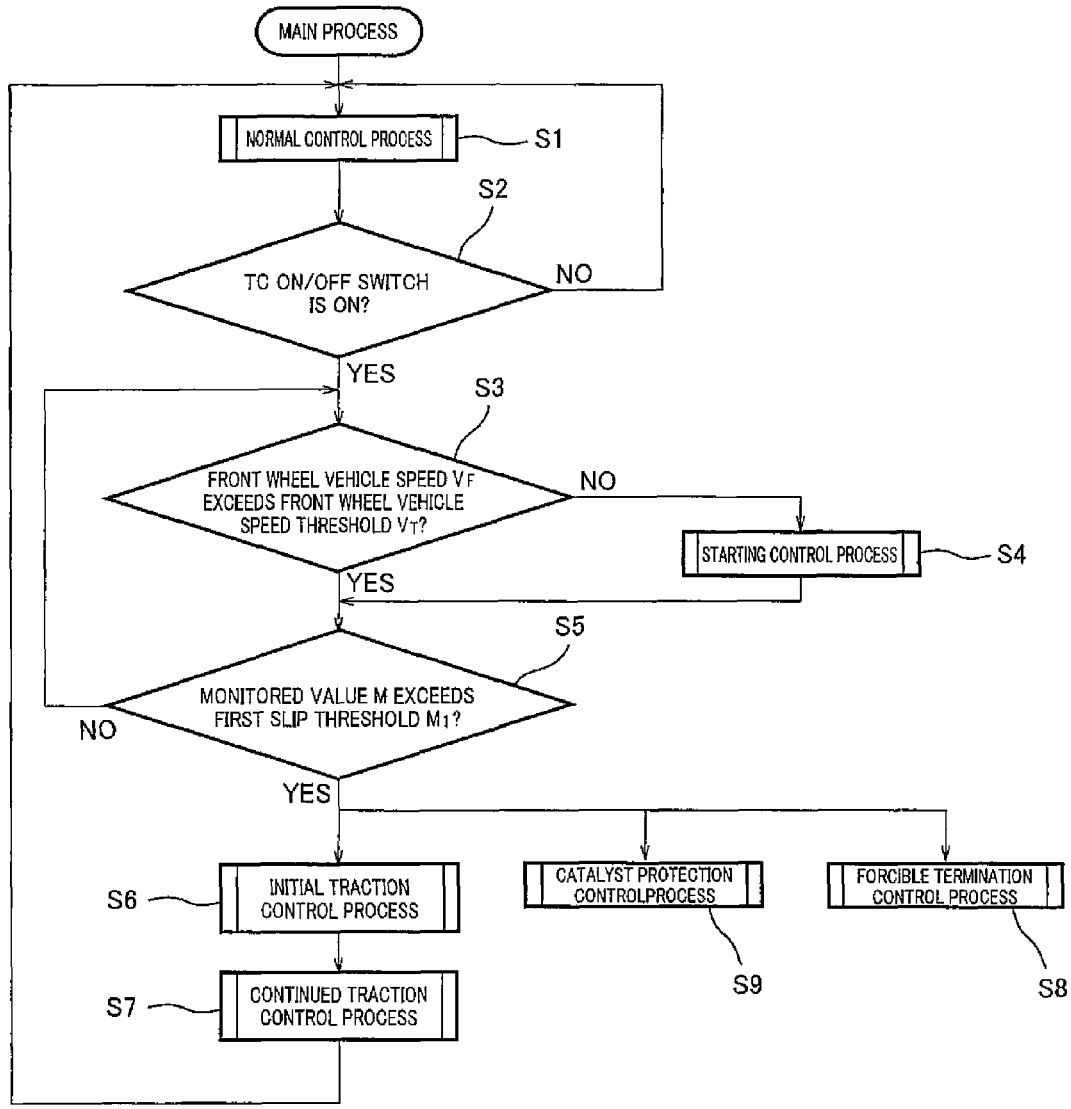
FIG. 4 is a flowchart showing a main process of the engine ECU of FIG. 3.

Subsequently, the traction control will be described in detail. FIG. 4 is a flowchart showing a min process of the engine ECU 17 of FIG. 3. As shown in FIGS. 3 and 4, when a main electric power supply (not shown) of the motorcycle 1 is turned ON, the engine ECU 17 initiates normal control in which the traction control described later is not executed (step S1). Then, the engine ECU 17 determines whether or not the traction control ON/OFF switch 40 is in an ON-state (step S2). If it is determined that the switch 40 is in an OFF-state, the normal control is continued. If it is determined that the switch 40 is in an ON-state, it is determined if the front wheel vehicle speed $V_F$ received from the ECU 33 for CBS exceeds the front wheel vehicle speed threshold $V_T$ (see FIG. 6) (step S3). The front wheel vehicle speed threshold $V_T$ is, for example, a value which is $0 < V_T (km/h) < 10$. If it is determined that the front wheel vehicle speed $V_F$ does not exceed the front wheel vehicle speed threshold $V_T$, it is determined that the motorcycle 1 is in a state before starting and the starting control process is executed as described later (step S4).

If it is determined that the front wheel vehicle speed $V_F$ exceeds the front wheel vehicle speed threshold $V_T$, the threshold determiner unit 46 (FIG. 3) of the engine ECU 17 determines whether or not the monitored value M exceeds the first slip threshold $M_1$ (step S5). That is, in step S5, the threshold determiner unit 46 determines whether or not the start condition for the traction condition is satisfied. The first slip threshold $M_1$ is set to a value which is larger than the second slip threshold $M_2$ as described later to prevent wrong detection by the ECU 17 that the rear wheel 3 is slipping even though the rear wheel 3 is gripping the road surface R normally without spinning. For example, the first slip threshold $M_1$ is set to a value which is not smaller than twice as large as the second slip threshold $M_2$ and is not larger than ten times as large as the second slip threshold $M_2$. The first slip threshold $M_1$ will be described in detail later.

If it is determined that the monitored value M does not exceed the first slip threshold $M_1$ in step S5, the process returns to step S3. On the other hand, if it is determined that the monitored value M exceeds the first slip threshold $M_1$, the initial traction control process is executed (step S6) and then the continued traction control process is executed (step S7) as the traction control. A forcible termination control process (step S8) and a catalyst protection control process (step S9) will be described later.

Figure 5:
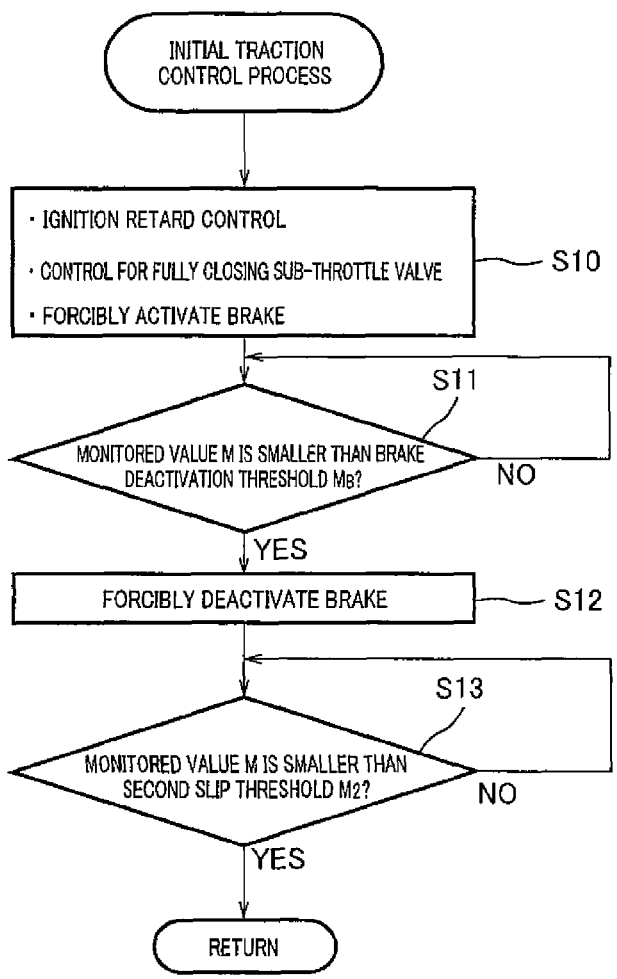
FIG. 5 is a flowchart of an initial traction control process of FIG. 4.
Figure 8:
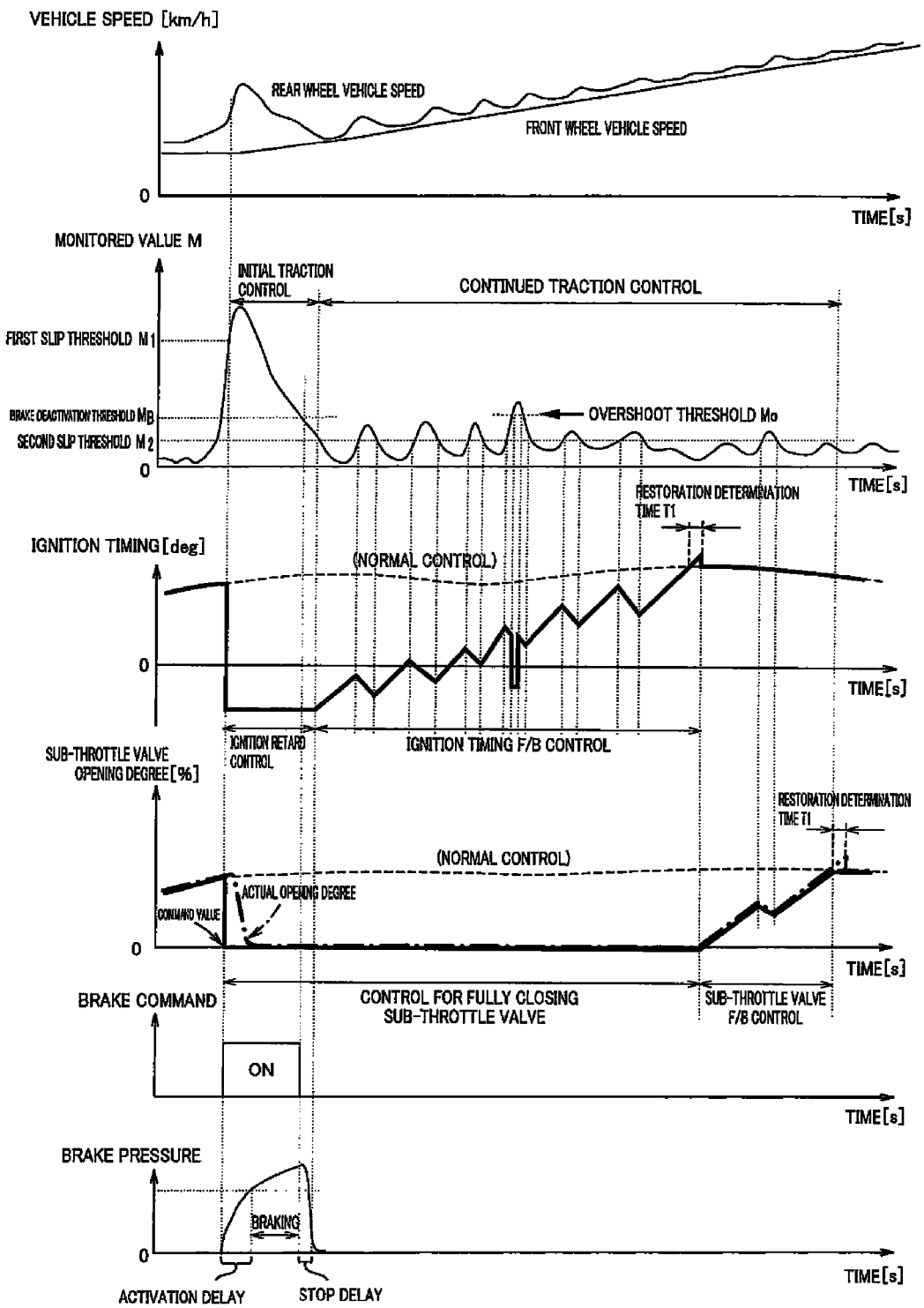
FIG. 8 is a graph and timing chart showing the initial traction control and the continued traction control in a case where a continuous slip occurs.

FIG. 5 is a flowchart of the initial traction control process of FIG. 4. FIG. 8 is a graph and timing chart showing the initial traction control and the continued traction control in a case where a continuous slip occurs. As shown in FIG. 8, when the monitored value M exceeds the first slip threshold $M_1$, the traction control unit 47 performs the control as described below to initiate the initial traction control process to reduce the driving power of the rear wheel 3.

As shown in FIGS. 5 and 8, in the initial traction control process, initially, a driving power reducing control is executed (step S10). To be specific, the traction control unit 47 causes the ignition control unit 42 to command the igniter 26 to execute ignition retard control. The ignition retard control is control for retarding an ignition tinting by a certain angle amount. Simultaneously, the traction control unit 47 causes the throttle valve control unit 43 to command the valve actuator 24 to bring the sub-throttle valve 22 to a substantially fully closed opening degree corresponding to an idling opening degree so that an air-intake amount is reduced (in a sub-throttle valve opening degree graph of FIG. 8, solid lines indicate command values and one-dotted lines indicate actual opening degrees. Hereinafter, in other sub-throttle valve opening degree graphs, the solid lines indicate the command values in the same manner). Simultaneously, the traction control unit 47 causes the brake control unit 44 to command the ECU 33 for CBS to activate the rear wheel brake 38.

A reduction amount of the driving power in the case where the monitored value M exceeds the first slip threshold $M_1$ in the initial traction control is set larger than a reduction amount of the driving power in the case where the monitored value M exceeds the second slip threshold $M_2$ in the continued traction control as described later. This makes it possible to restore the traction in a short time at the time point of a first detection of a slip and to suppress that the driving power is reduced excessively for a longer time under the situation where the slip is occurring continuously.

Then, it is determined whether or not the monitored value M is smaller than the brake deactivation threshold $M_B$ which is a driving power reduction suppression threshold (step S11). If it is determined that the monitored value $M_B$ is not smaller than the brake deactivation threshold $M_B$, step S11 is repeated. If it is determined that the monitored value M becomes smaller than the brake deactivation threshold $M_B$, a driving power reduction suppression control is executed (step S12). To be specific, the rear wheel brake 38 is deactivated. Then, it is determined whether or not the monitored value M is smaller than the second slip threshold $M_2$ (step S13). As the threshold used in step S13, a switching threshold which is larger than the second slip threshold $M_2$ and smaller than the first slip threshold $M_1$ may be set, separately from the second slip threshold $M_2$.

If it is determined that the monitored value M is not smaller than the second slip threshold $M_2$, step S13 is repeated and the initial traction control is controlled. If it is determined that the monitored value M becomes smaller than the second slip threshold $M_2$, the initial traction control process is terminated and the process returns to the main process of FIG. 4. Thus, the initial traction control process transitions to the continued traction control process (step S7).

Figure 6:
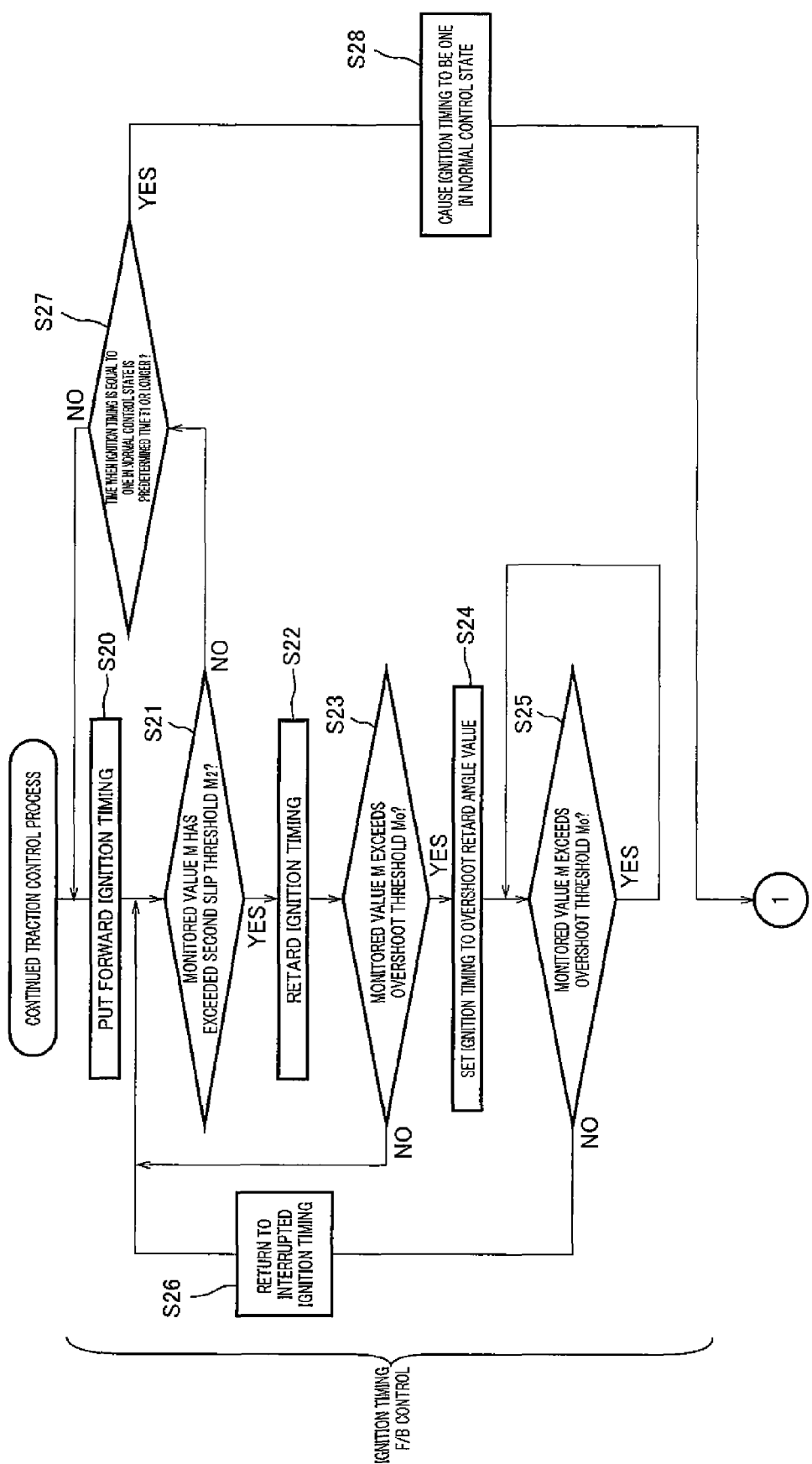
FIG. 6 is a flowchart of a front half part of a continued traction control process of FIG. 4.
Figure 7:
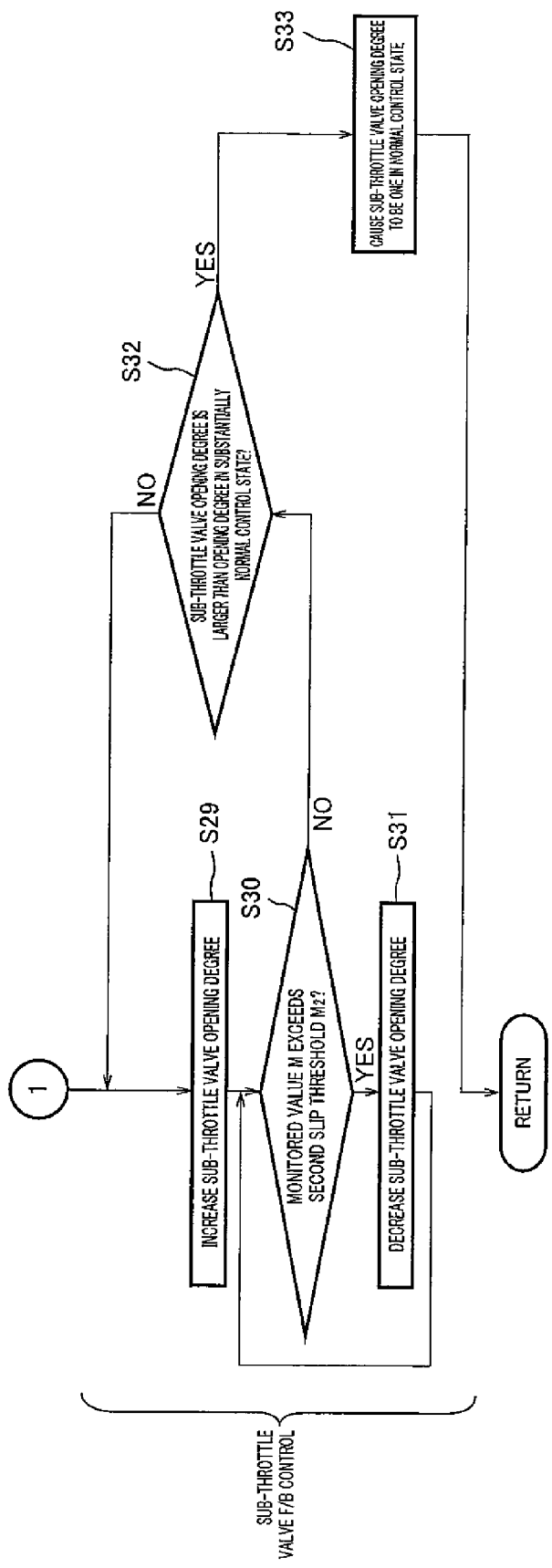
FIG. 7 is a flowchart of a rear half part of the continued traction control process of FIG. 4.

FIG. 6 is a flowchart of a front half part of the continued traction control process of FIG. 4. FIG. 7 is a flowchart of a rear half part of the continued traction control process of FIG. 4. As shown in FIG. 8, in the continued traction control process, ignition timing feedback control is used so that the monitored value M is closer to the second slip threshold $M_2$. That is, the feedback control is performed supposing that the second slip threshold $M_2$ is a target value of the monitored value M.

To be specific, as shown in FIGS. 6 and 8, initially, in order to increase the driving power of the rear wheel 3, the ignition timing is put forward by a predetermined angle amount to make the control state closer to the normal control state (step S20). The aforesaid predetermined angle amount may be a certain width or may be a value which is variable according to a deviation between the monitored value M and the second slip threshold $M_2$. If the ignition retard angle amount becomes equal to the one in the normal control state, the associated ignition timing is maintained.

It is determined whether or not the monitored value M exceeds the second slip threshold $M_2$ (step S21). If it is determined that the monitored value M does not exceed the second slip threshold $M_2$, it is determined whether or not a restoration condition that a match time when the ignition timing is equal to the ignition timing in the normal control state is a predetermined restoration determination time $T_1$ or longer is satisfied (step S27). If it is determined that the match time is shorter than the restoration determination time $T_1$, the process returns to step S20 to put forward the ignition timing by a predetermined angle amount. On the other hand, if it is determined the monitored value M exceeds the second slip threshold $M_2$ in step S21, the ignition timing is retarded by a predetermined angle amount to reduce the driving power of the rear wheel 3 (step S22).

After step S22, it is determined whether or not the monitored value M exceeds an overshoot threshold Mo (step S23). If it is determined that the monitored value M is smaller than the overshoot threshold Mo in step S23, the process returns to step S21 and the ignition timing feedback control is continued. That is, for example, in a case where the rear wheel 3 is slipping continuously on the road surface R in the ignition timing feedback control, the ignition timing is put forward (step S20) or retarded (step S22) repetitively little by little and is gradually close to the ignition timing in the normal control state.

On the other hand, if it is determined that the monitored value M exceeds the overshoot threshold Mo, the ignition timing feedback control is interrupted, and the ignition timing is set to an overshoot retard angle value which is retarded by an amount which is larger than the retard angle amount in step S22 (step S24). This is done to reduce the driving power with a larger width than a reduction width of the driving power which is reduced when the ignition timing is retarded by the predetermined angle amount in step S22. The ignition timing in step S24 is maintained as long as the monitored value M continues to exceed the overshoot threshold Mo (step 825).

Then, if it is determined that the monitored value M becomes smaller than the overshoot threshold Mo (step S25), the interrupted ignition timing feed back control is resumed (step S26), and the process returns to step S21. The initial value of the ignition timing at the time of resuming of the ignition feedback control is set to an ignition timing immediately before the time point when it is determined as YES in previous step S23.

If it is determined that the monitored value M is smaller than the second slip threshold $M_2$ in step S21, it is determined whether or not the restoration condition that the match time when the ignition timing is equal to the ignition timing in the normal control state is the predetermined restoration determination time $T_1$ or longer is satisfied (step S27). If it is determined that the match time is the predetermined restoration determination time $T_1$ or longer, the ignition timing feedback control is terminated and the ignition timing reaches the one in the normal control state (step S28).

Then, as shown in FIG. 7, the sub-throttle valve feedback control is executed. To be specific, initially, the sub-throttle valve opening degree is increased by a predetermined amount to be closer to a sub-throttle valve opening degree in the normal control state (step S29). Then, it is determined whether or not the monitored value M exceeds the second slip threshold $M_2$ (step S30). If it is determined that the monitored value M exceeds the second slip threshold $M_2$, the sub-throttle valve opening degree is decreased (step S31) and the process returns to step S30. If it is determined that the monitored value M does not exceed the second slip threshold $M_2$, it is determined whether or not the time when the sub-throttle valve opening degree becomes larger than an opening degree in a substantially normal control state, to be precise, an opening degree obtained by adding a slight opening degree to the opening degree in the normal control state, is the restoration determination time $T_1$ or longer (step S32).

The reason why the opening degree is added is to prevent that the termination condition of the control is satisfied when the sub-throttle valve opening degree reaches a fully closed opening degree even though the sub-throttle feedback control should be continued, in a state where the sub-throttle valve opening degree is the fully closed opening degree (e.g., during a low engine speed state) under the normal control.

If it is determined that the sub-throttle valve opening degree is smaller than the opening degree obtained by adding the opening degree to the opening degree in the normal control state, the process returns to step S29, and the sub-throttle valve is opened by a predetermined amount so that the opening degree is closer to the opening degree in the normal control state. If it is determined that the time when the sub-throttle valve opening degree is larger than the opening degree obtained by adding the opening degree to the opening degree in the normal control state, reaches the restoration determination time T1 or longer, then it is determined that the restoration condition is satisfied and the sub-throttle valve feedback control is terminated. The sub-throttle valve opening degree is caused to be the one in the normal control state (step S33) and the process returns to the main process of FIG. 4. Thus, the driving power of the rear wheel 3 returns to the driving power in the normal control state where the traction control is not executed.

The driving power of the rear wheel 3 is reduced in the traction control in such a manner that the brake is activated, the ignition is retarded and the throttle valve opening degree is decreased in this order. This is because the responsiveness to reduction of the driving power decreases in this order, and at a first detection of a slip, the traction can be restored with higher responsiveness, making it possible to suppress an excess reduction of the driving power for a long time period. In addition the driving power is controlled in a stepwise manner in such a manner that a first driving power reducing device corresponding to the brake, a second driving power reducing device for retarding ignition and a third driving power reducing device corresponding to the sub-throttle valve are started in this order and stopped in this order. Therefore, the driving power can be reduced smoothly and good driveability is maintained.

Whereas in this embodiment as the engine driving power control for increasing and reducing the power of the engine E, the ignition retard control and the air-intake amount control are used. In a case where the engine has plural cylinders, ignition corresponding to a part of the plural cylinders of the engine may be caused to pause, thereby reducing the engine driving power. Alternatively, the engine driving power may be reduced by causing ignition of the cylinders of the engine to pause intermittently. In a further alternative, the engine driving power may be controlled by controlling a fuel injection amount.

Figure 9:
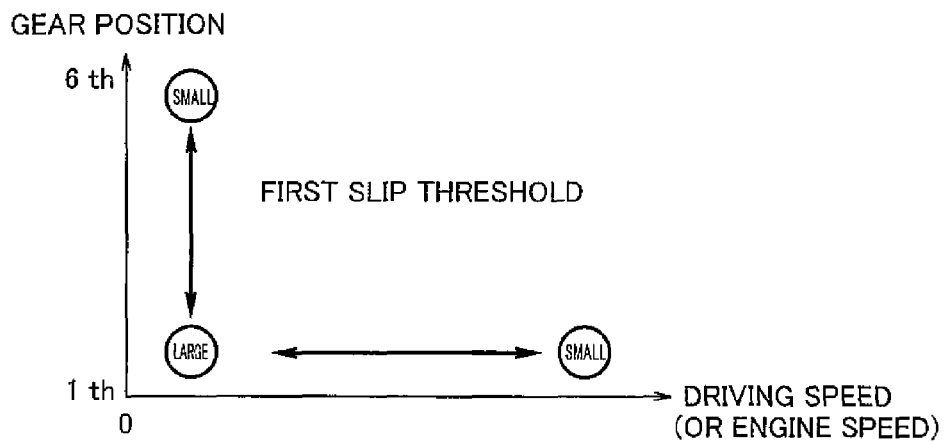
FIG. 9 is a map used for determining a first slip threshold shown in FIG. 8.

FIG. 9 is a map used for determining the first slip threshold $M_1$ shown in FIG. 8. As shown in FIG. 9, the first slip threshold $M_1$ is set so as to decrease as the transmission gear position detected by the gear position sensor 29 is higher, i.e., a reduction gear ratio is lower. The map may contain a setting configured such that the first slip threshold $M_1$ corresponding to at least a certain transmission gear position is smaller than the first slip threshold $M_1$ corresponding to a transmission gear position lower than the certain transmission gear position. For example, the map may contain a setting configured such that the first slip threshold $M_1$ corresponding to a 2nd gear is smaller than the first slip threshold $M_1$ corresponding to a 1st gear and is equal to the first slip threshold $M_1$ corresponding to a 3rd gear.

The first slip threshold $M_1$ is set so as to decrease as the driving speed or the engine speed of the motorcycle 1 increases. Since the front wheel 2 is a driven wheel, it may be assumed that the driving speed of the motorcycle 1 is equal to the front wheel vehicle speed $V_F$ obtained from the ECU 33 for CBS. The map may contain a setting configured such that at least the first slip threshold $M_1$ corresponding to a certain driving speed or a certain engine speed is smaller the first slip threshold $M_1$ corresponding to a driving speed or an engine speed which is lower than the certain driving speed or the certain engine speed. For example, the map may contain a setting configured such that the fast slip threshold $M_1$ corresponding to an engine speed of 4000 rpm is smaller than the first slip threshold $M_1$ corresponding to an engine speed of 1000 rpm and equal to the first slip threshold $M_1$ corresponding to an engine speed of 6000 rpm. Instead of the map, the first slip threshold $M_1$ may be set using a calculation formula. The second slip threshold $M_2$ may be changed according to driving conditions such as the transmission gear position, the driving speed, or the engine speed, as in the first slip threshold $M_1$.

Furthermore, at least one of the first slip threshold $M_1$ and the second slip threshold $M_2$ may be changed according to the throttle valve opening degree detected by the throttle valve position sensor 25, i.e., the amount of throttle operation performed by the driver. For example, the second slip threshold $M_2$ may be set so as to increase as the amount of operation for opening the throttle valve increases. In this case, the amount of throttle operation may correspond to one at the initiation of the traction control or one during the traction control.

Figure 10:
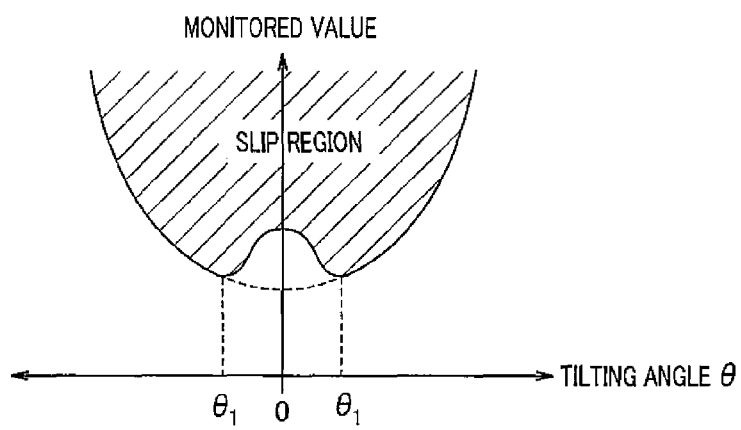
FIG. 10 is a graph showing the relationship between a vehicle body tilting angle and a monitored value.
Figure 11:
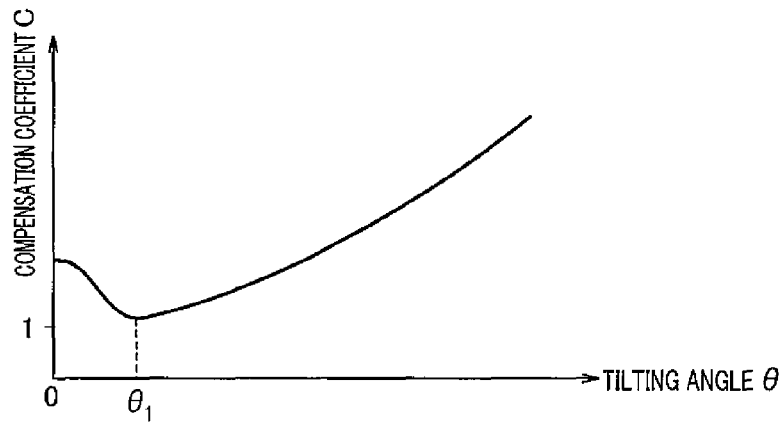
FIG. 11 is a compensation map used for compensating the first slip threshold shown in FIG. 8.

FIG. 10 is a graph showing the relationship between a vehicle body tilting angle θ and the monitored value M. FIG. 11 is a compensation map for compensating the first slip threshold $M_1$ shown in FIG. 10. In a horizontal axis of FIG. 10, a right region indicates that a vehicle body is tilted to a right side, and a left region indicates that a vehicle body is tilted to a left side. The tilting angles θ in the right region and the left region are expressed as positive values. As can be seen from FIG. 10, the monitored value M in the case where the rear wheel 3 starts to slip on the road surface R tends to increase as the tilting angle θ increases in a region where the right and left tilting angles θ of the vehicle body with respect to the driving direction is predetermined angle $θ_1$ or larger (e.g., 10 degrees or larger). That is, when the motorcycle 1 is driving in a state where the vehicle body is tilted, there is a tendency that a difference between the front wheel vehicle speed $V_F$ and the rear wheel vehicle speed $V_R$ is large, even though the rear wheel 3 is gripping the road surface R. In a straight-ahead driving state which is a region where the tilting angle θ is smaller than the predetermined angle $θ_1$ (e.g., smaller than 10 degrees), the monitored value M with which it is considered that the slip starts is set greater, to allow greater acceleration. To this end, a compensation coefficient C shown in FIG. 10 is used. The compensation coefficient C is set so as to increase as the tilting angle θ detected by the tilting angle sensor 32 increases in the region where the tilting angle θ is the predetermined angle $θ_1$ or larger (e.g., 10 degrees or larger). In addition, the compensation coefficient C is set so as to increase as the tilting angle θ decreases in a region where the tilting angle θ is smaller than the predetermined angle $θ_1$ (e.g., smaller than 10 degrees).

In this embodiment the first slip threshold $M_1$ is obtained by multiplying the value set in the map of FIG. 9 by the compensation coefficient C. Therefore, the first slip threshold $M_1$ is set so as to increase as the tilting angle θ increases. As in the first slip threshold $M_1$, the second slip threshold $M_2$ (gripping threshold) may be set so as to increase as the vehicle body tilting angle θ increases. A determination method of the first slip threshold $M_1$ and the second slip threshold $M_2$ is merely exemplary and may be constant irrespective of the speed, the gear ratio, or the tilting angle.

Figure 12:
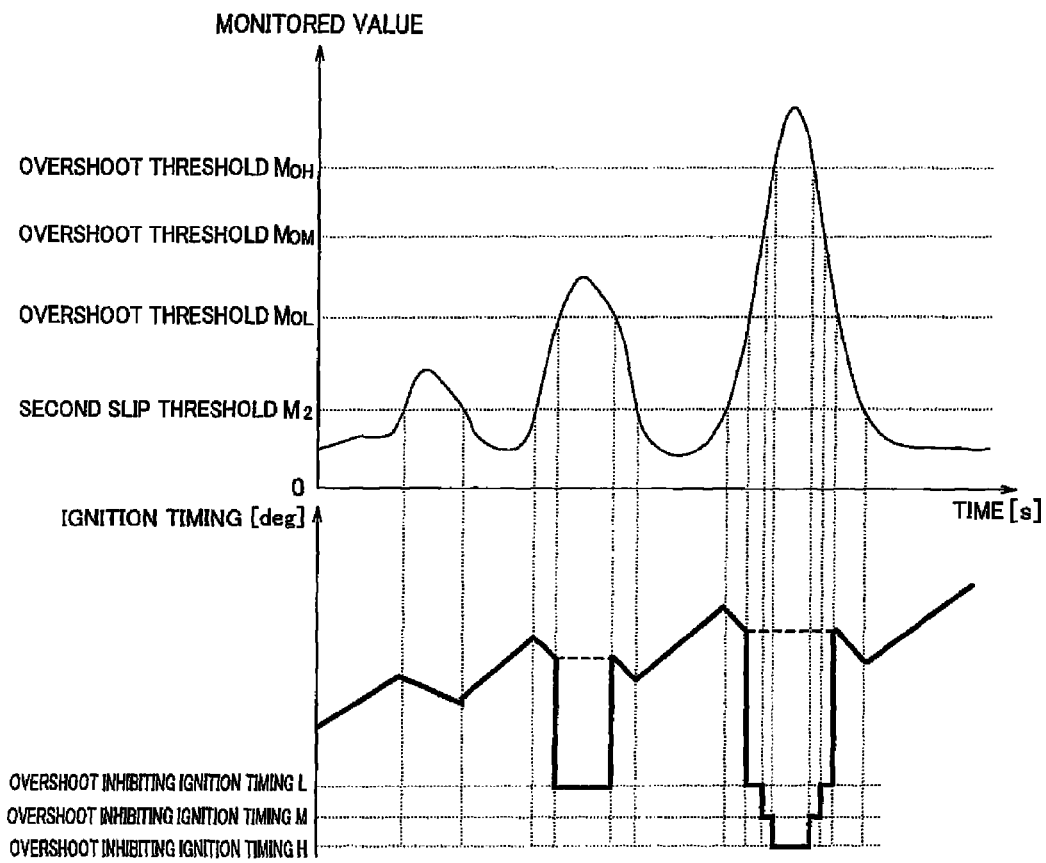
FIG. 12 is a graph and timing chart showing modification for inhibiting overshoot.

Whereas one overshoot threshold Mo is provided in the example shown in FIG. 8, plural stages of thresholds may be provided. FIG. 12 is a graph and timing chart showing modification for inhibiting overshoot. As shown in FIG. 12, for example, the overshoot threshold may be set in plural stages: $M_{OH}$, $M_{OM}$, and $M_{OL}$, and the ignition timings H, M, and L which are respectively controlled in the case where the monitored value M exceeds the overshoot thresholds $M_{OH}$, $M_{OM}$, and $M_{OL}$ may be set in a stepwise manner so that the retard angle amount increases in the order of $M_{OL}$, $M_{OM}$, and $M_{OH}$.

Figure 13:
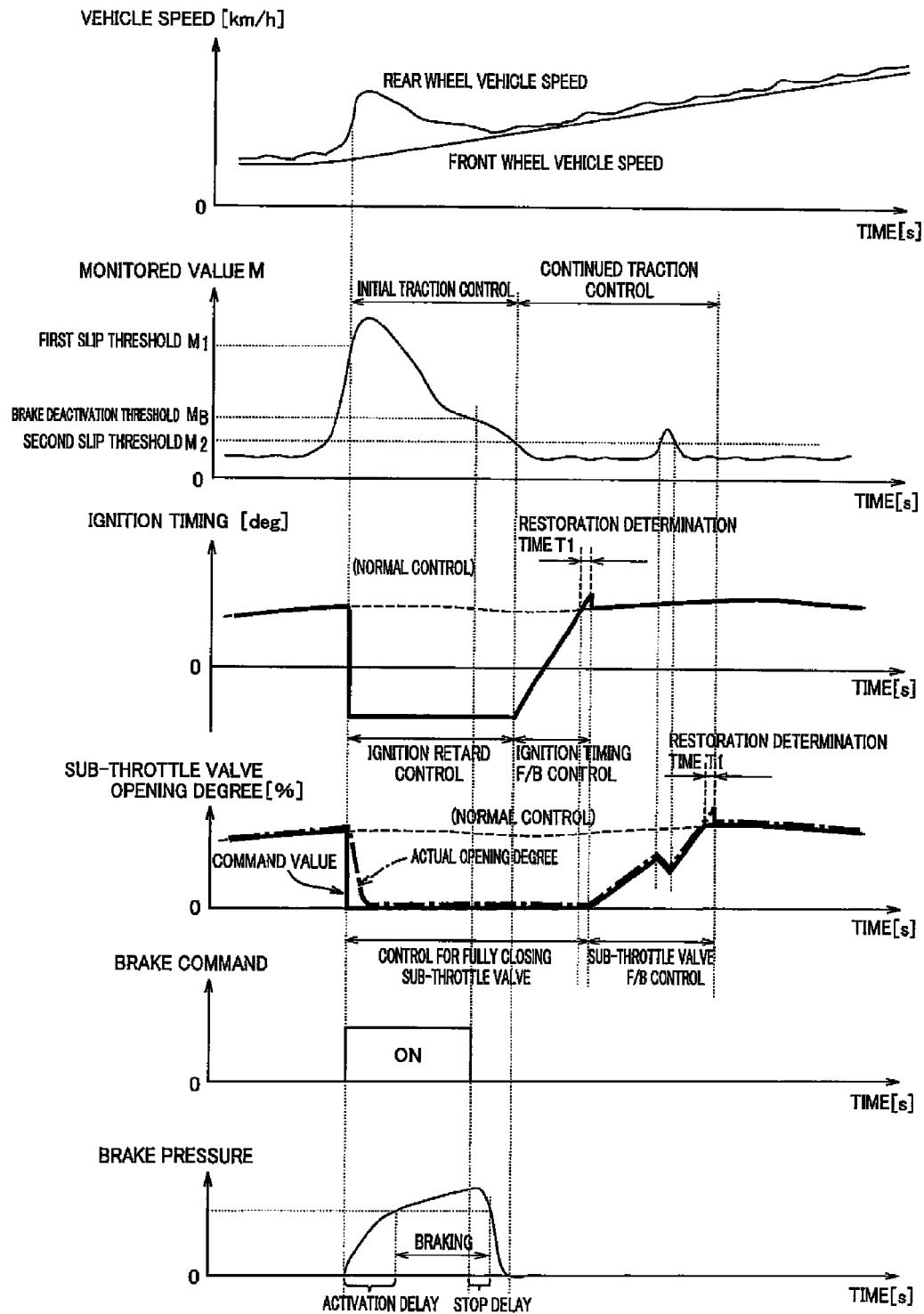
FIG. 13 is a graph and timing chart showing the initial traction control and the continued traction control in a case where an instantaneous slip occurs.

FIG. 13 is a graph and timing chart showing the initial traction control and the continued traction control in a case where an instantaneous slip occurs. In a case where the rear wheel 3 slips instantaneously on the road surface R as shown in FIG. 13, for example, the rear wheel 3 is traveling over a wet manhole, the control process occurs according to the flowcharts shown in FIGS. 4 to 6, as in the case of the above described continuous slip shown in FIG. 13. As shown in FIG. 13, when the slip of the rear wheel 3 on the road surface R is instantaneous and the slip quickly stops after the monitored value has reached the first slip threshold $M_1$, the motorcycle 1 quickly transitions to a state where the monitored value M continues to be smaller than the second slip threshold $M_2$, and the continued traction control which is executed after and continuously with the initial traction control is quickly terminated.

Figure 14:
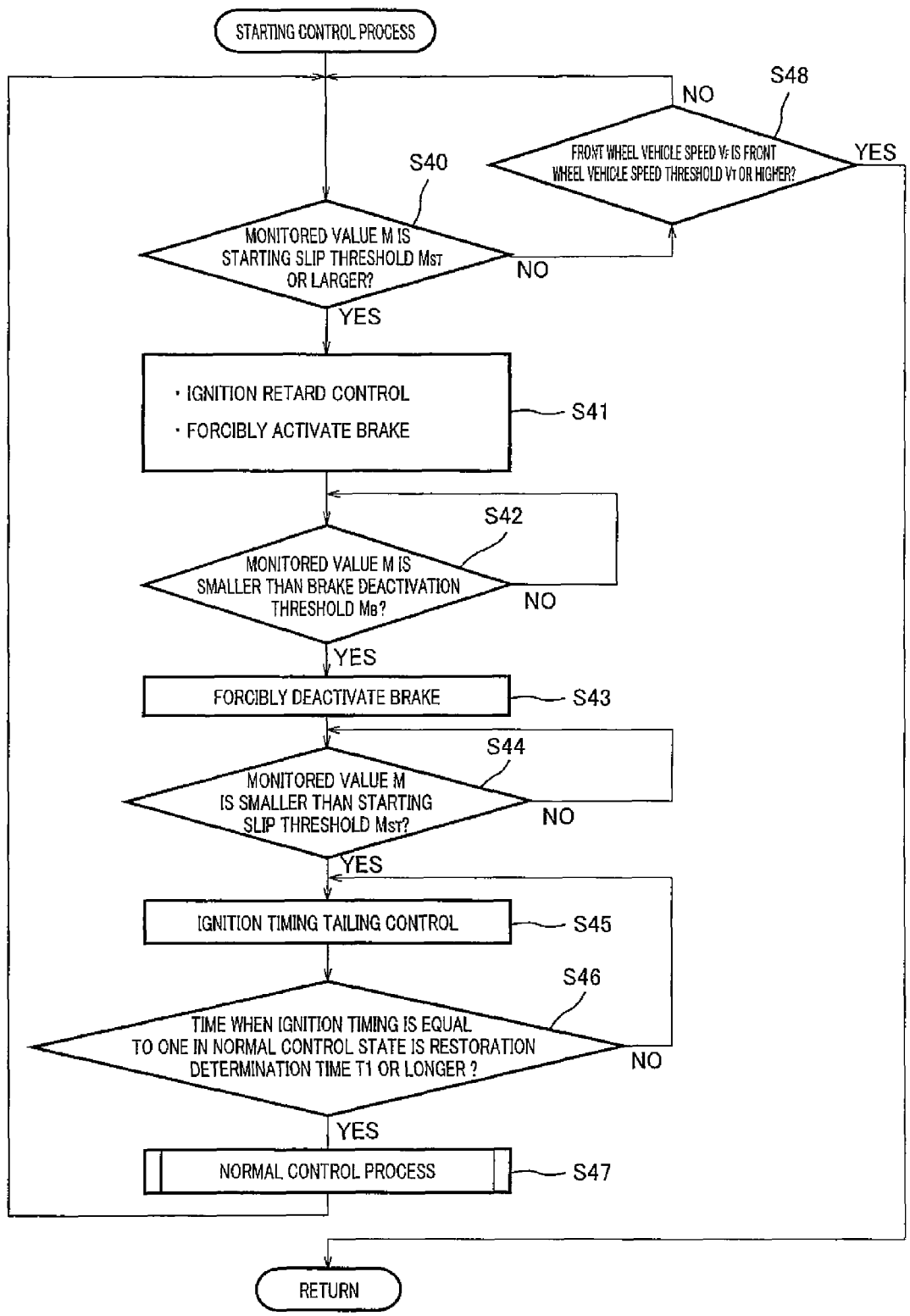
FIG. 14 is a flowchart of a stating control process of FIG. 4.
Figure 15:
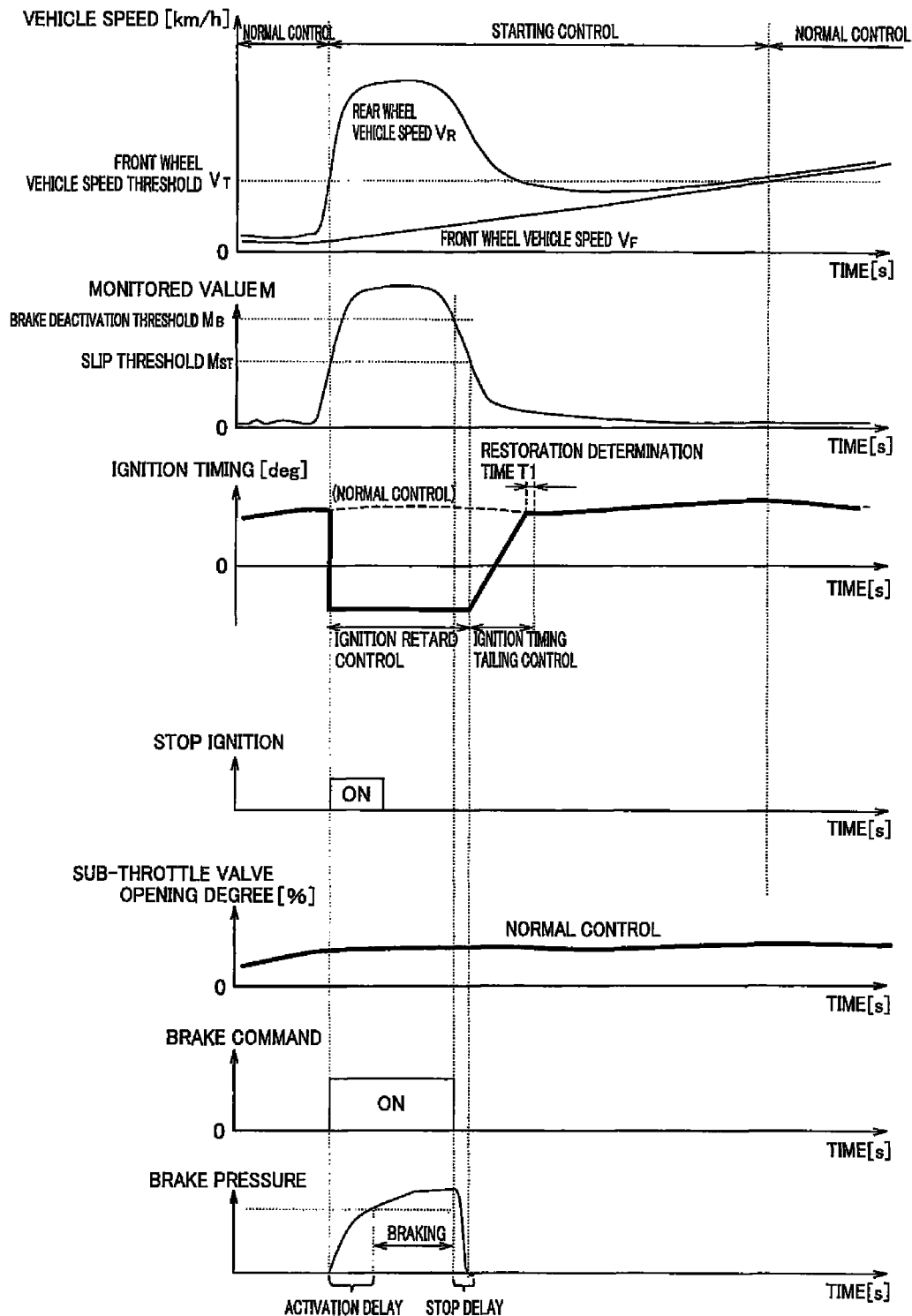
FIG. 15 is a graph and timing chart showing the starting control process.

FIG. 14 is a flowchart of the starting control process of FIG. 4. FIG. 15 is a graph and timing chart showing the starting control process. As shown in FIGS. 14 and 15, in the starring control process, the engine ECU 17 determines whether or not the monitored value M exceeds the starting slip threshold $M_{ST}$ (step S40). Note that the starting slip threshold $M_{ST}$ is fixed. If it is determined that the monitored value M exceeds the staring slip threshold $M_{ST}$, the control for reducing the driving power of the rear wheel 3 is executed (step S41). To be specific, the ignition retard control for retarding the ignition timing by a predetermined angle amount is executed in such a manner that the ignition is stopped during predetermined strokes and the rear wheel brake 38 is forcibly activated. Whereas in step S41, the sub-throttle valve opening degree is maintained at the opening degree in the normal control state, it may be controlled to be a fully closed opening degree as in the configuration of FIG. 8.

Then, the ECU 17 determines whether or not the monitored value M is smaller than a driving power reduction suppression threshold $M_B$, i.e., smaller than a brake deactivation threshold $M_B$ (step S42). If it is determined that the monitored value M is not smaller than the brake deactivation threshold $M_B$, the state where the rear wheel brake 38 is activated is maintained. If it is determined that the monitored value M is smaller than the brake deactivation threshold $M_B$, the driving power reduction suppression control is executed (step S43). To be specific, the rear wheel brake 38 is deactivated.

Then, the engine ECU 17 determines whether or not the monitored value M is smaller than a value smaller than the starring slip threshold $M_{ST}$ (step S44). If it is determined that the monitored value M is not smaller than the starting slip threshold $M_{ST}$, step S44 is repeated. If it is determined that the monitored value M is smaller than the starting slip threshold $M_{ST}$, the retard angle amount of the ignition timing is gradually decreased. That is, ignition timing tailing control for gradually putting forward the ignition timing is executed (step S45). Then, the engine ECU 17 determines whether or not the restoration condition that the match time when the ignition timing is equal to the ignition timing in the normal control state is predetermined restoration determination time T1 or longer is satisfied (step S46).

If it is determined that the match time is shorter than the predetermined restoration determination time T1, the ignition timing tailing control is continued. On the other hand, if it is determined that the match time is the predetermined restoration time T1 or longer, the process returns to the normal control process (step S47) and returns to step S40. If it is determined that the monitored value M does not exceed the starting slip threshold $M_{ST}$, it is determined whether or not the front wheel vehicle speed $V_F$ exceeds the front wheel vehicle speed threshold $V_T$ (step S48). If it is determined that the front wheel vehicle speed $V_F$ does not exceed the front wheel vehicle speed threshold $V_T$, the process returns to step S40. If it is determined that the front wheel vehicle speed $V_F$ exceeds the front wheel vehicle speed threshold $V_T$, the starting control process is terminated, and the process returns to the main process of FIG. 4.

Next the forcible termination control process and the catalyst protection control process will be described. If it is determined that the monitored value M exceeds the first slip threshold $M_1$ in step S5 in FIG. 4, the forcible termination control process (step S8) and the catalyst protection control process (step S9) are executed concurrently with the initial traction control process and the continued traction control process.

Figure 16:
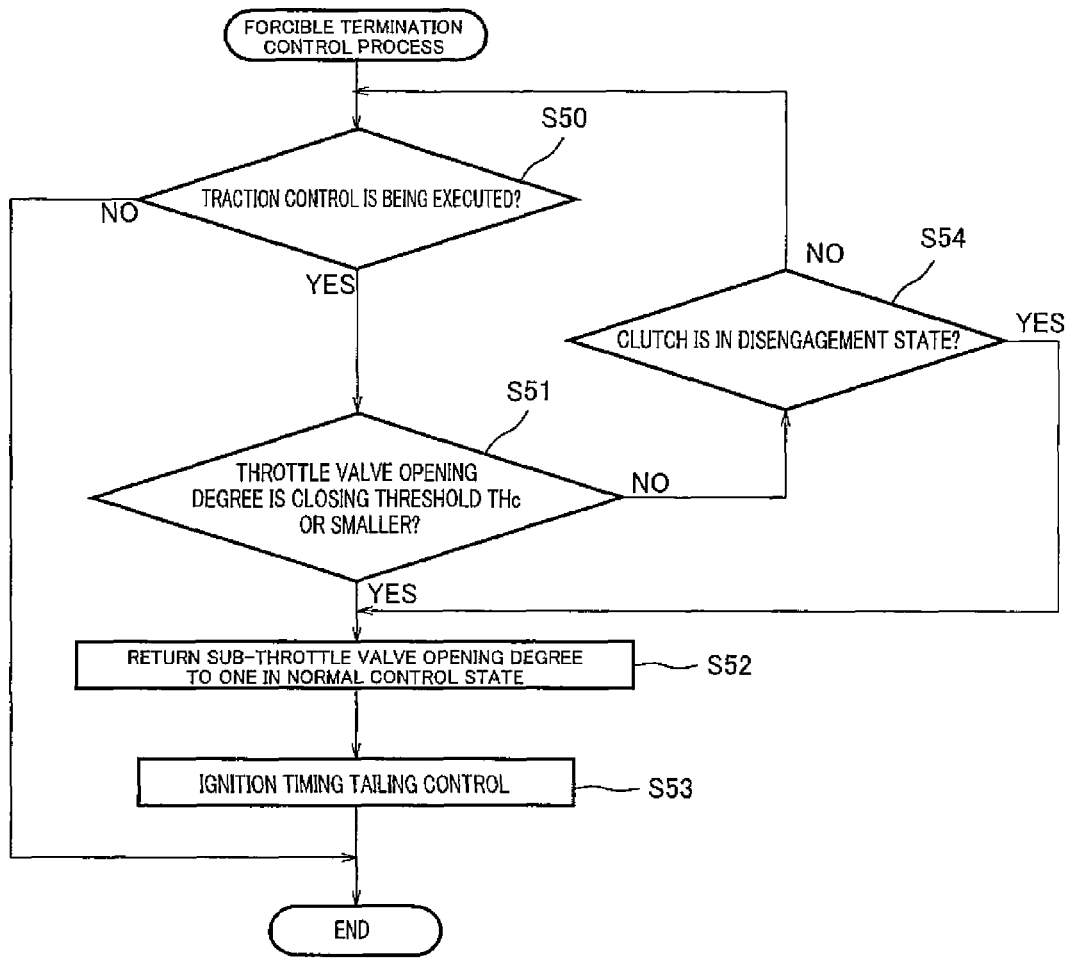
FIG. 16 is a flowchart showing a forcible termination control process of FIG. 4.
Figure 17:
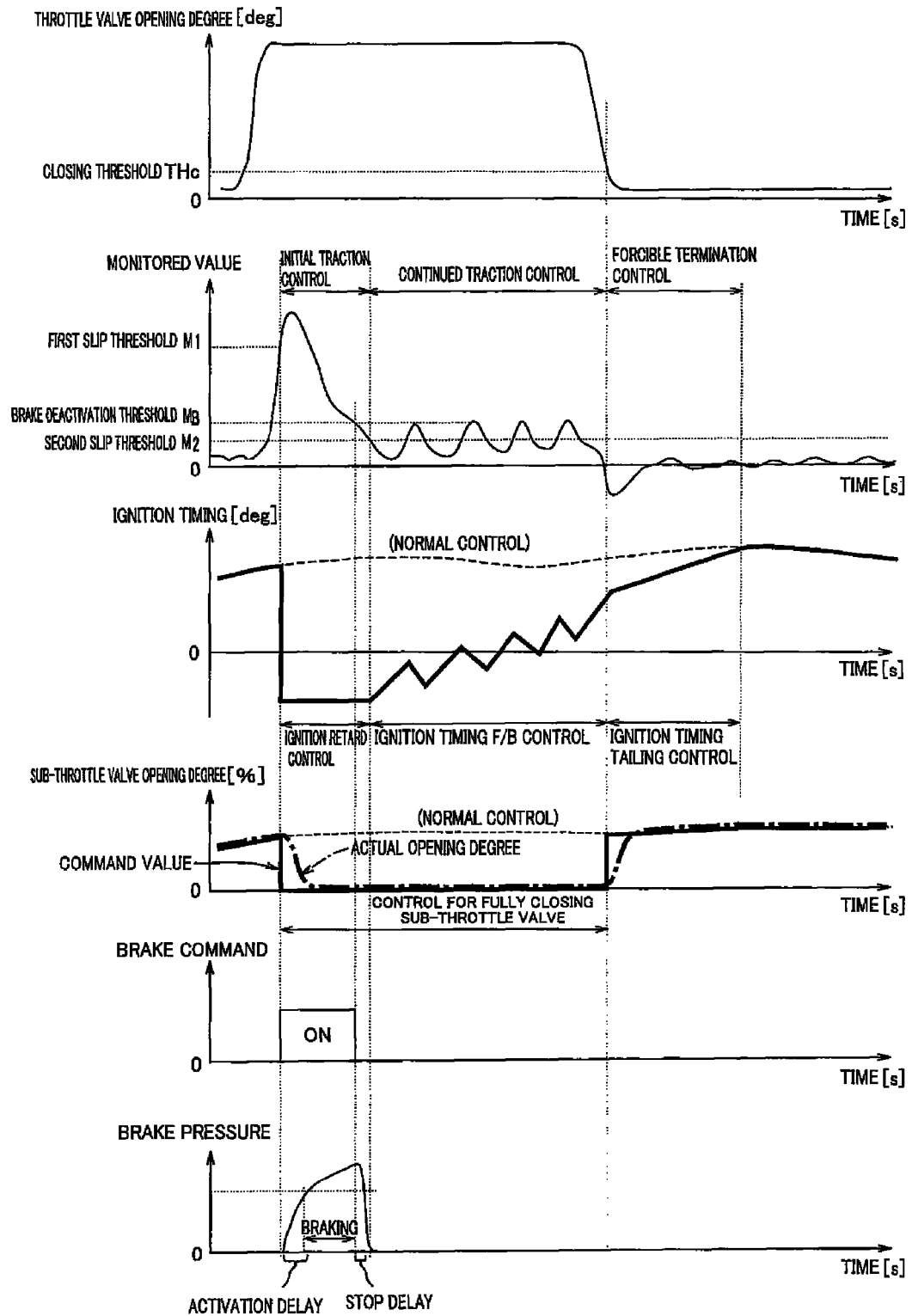
FIG. 17 is a graph and timing chart showing the forcible termination control process.

FIG. 16 is a flowchart showing the forcible termination control process of FIG. 4. FIG. 17 is a graph and timing chart showing the forcible termination control process. As shown in FIGS. 16 and 17, the engine ECU 17 determines whether or not the traction control is being executed (step S50). If it is determined that the traction control is not being executed, the forcible termination control process is terminated if it is determined that the traction control is being executed, it is determined whether or not the throttle valve opening degree detected by the throttle valve position sensor 25 is not larger than the idling opening degree or a closing threshold THc which is close to the idling opening degree (step S51). That is, if it is determined that the throttle valve opening degree is the closing threshold THc or smaller, the sub-throttle valve opening degree is returned to the one in the normal control state (step S52), and the ignition timing tailing control for gradually decreasing the ignition retard angle amount with a predetermined rate and being terminated at the time point when the ignition retard angle amount reaches the one in the normal control state is executed (step S53). That is, if the driver performs the operation for closing the throttle grip 7, the throttle valve opening degree reaches the idling opening degree and the driving power of the rear wheel 3 is reduced even during the normal control state. Therefore, the traction control is forcibly terminated.

If it is determined that the throttle valve opening degree is larger than the closing threshold THc in step S51, it is determined whether or not the clutch 27 is in a disengagement state, to be specific, the driver is squeezing the clutch lever 8 (step S54). If it is determined that the driver is not squeezing the clutch lever 8, the process returns to step S50. If it is determined that the driver is squeezing the clutch lever 8, the process goes to steps S52 and S53, and the traction control is forcibly terminated. Since the driver is typically not operating the clutch lever 8 during occurrence of a slip, the traction control is forcibly terminated when the clutch lever 8 is operated by the driver, thereby maintaining good driveability. In addition since the traction control associated with the engine driving power control is effectively performed in the case where the engine driving power is transmitted to the drive wheel, the traction control is terminated irrespective of the throttle valve opening degree when the clutch operation is performed by the driver to disenable transmission of the driving power. This makes it possible to avoid that the driving power output is reduced under the state where the engine E is not subjected to a load from an axle.

Figure 18:
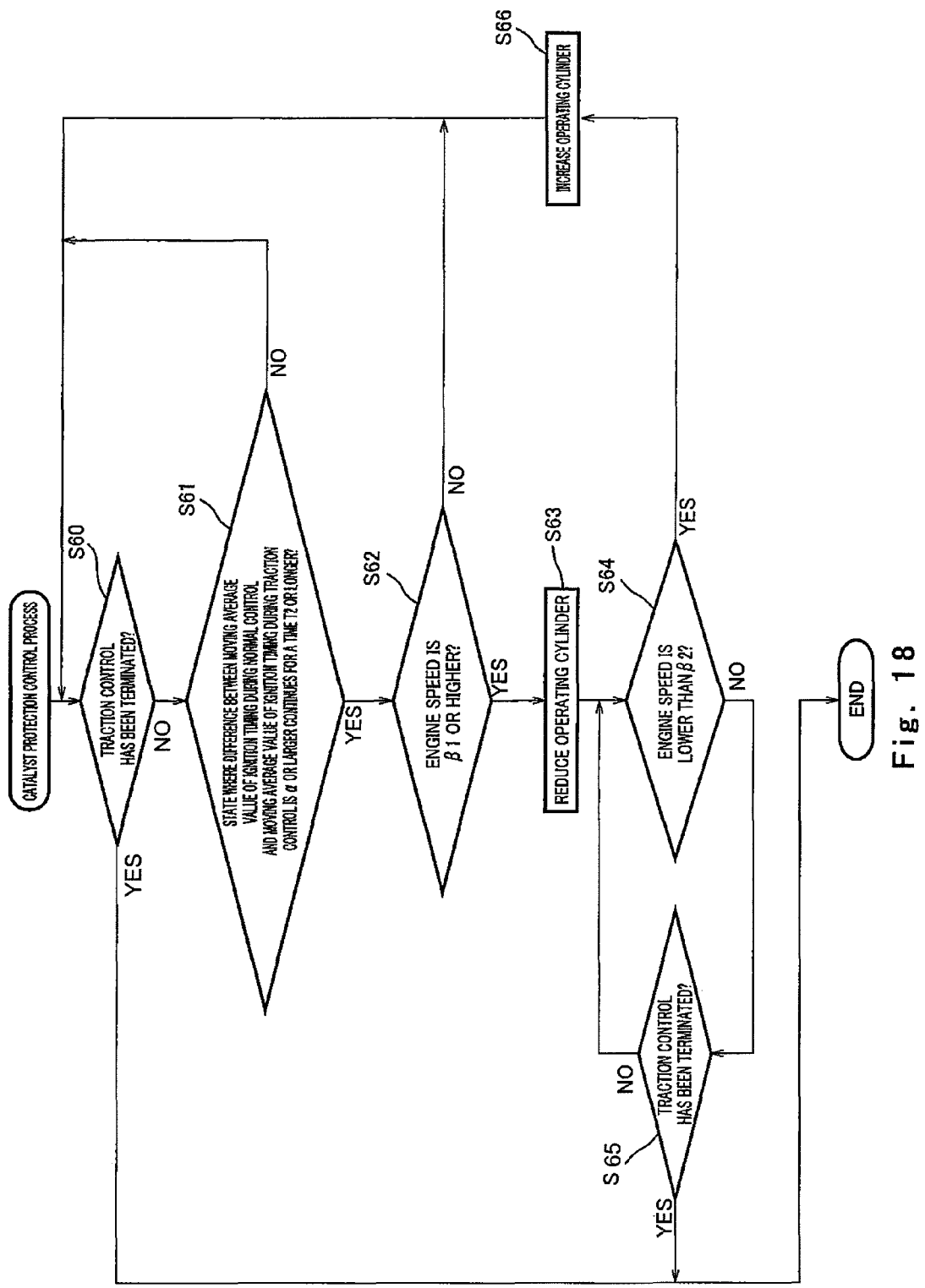
FIG. 18 is a flowchart of a catalyst protection control process of FIG. 4.
Figure 19:
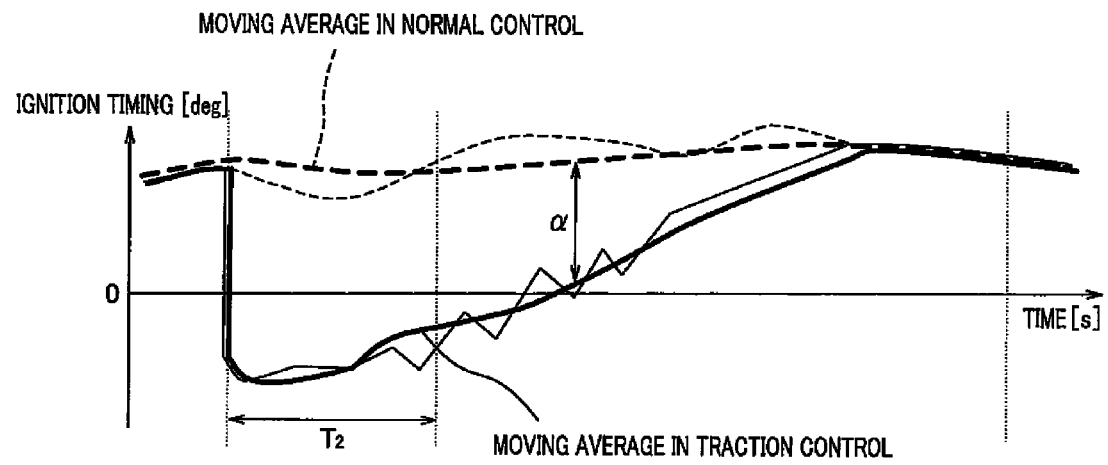
FIG. 19 is a graph showing the catalyst protection control process.

FIG. 18 is a flowchart of the catalyst protection control process of FIG. 4. FIG. 19 is a graph showing the catalyst protection control process. As shown in FIG. 18, initially, it is determined whether or not the traction control has been terminated (step S60). If it is determined that the traction control has not been terminated, it is determined whether or not the state where a difference between a moving average value of the ignition timing during the traction control and a moving average value of the ignition tiring during the normal control under the same condition is a predetermined value a or larger continues for a time T2 or longer (step S61). This is because if the integrated value of the difference in time series reaches a certain value or larger, a burden applied to the catalyst for purifying an exhaust gas increases as shown in FIG. 19. Alternatively, in step S61, it may be determined whether or not the integrated value reaches a predetermined value or larger. The term "moving average" refers to a known smoothing method for averaging the time series data in time.

If it is determined that the state where the difference is the predetermined value α or larger continues for the set time T2 or longer, it is determined whether or not an average value of the engine speed for the set time T2 is a first predetermined value β1 or higher (step S62). If it is determined that the engine speed is the first predetermined value β1 or higher, the engine E including n cylinders operates using (n−1) cylinders (step S63), where n is a natural number. That is, if the state where the ignition timing is retarded by a large angle amount is maintained when the engine E is driving at a high speed, the resulting exhaust gas imposes a burden on the catalyst provided in an exhaust system of the engine E. Therefore, by temporarily pausing the fuel feeding from the injector 31 to a part of the cylinders, the catalyst is protected. When the engine speed is expressed as β1, the relationship formed among α, T2, and β1 is such that the catalyst is subjected to a burden when the state where the difference between the moving average value of the ignition timing during the traction control and the moving average value of the ignition timing during the normal control under the same conditions is the predetermined value α or larger continues for the time T2 or longer.

Then, it is determined whether or not the engine speed is lower than a second predetermined value β2 (step S64). The second predetermined value β2 is a value smaller than the first predetermined value β1. If it is determined that the engine speed is not lower than the predetermined value β2, it is determined whether or not the traction control has been terminated (step S65). If it is determined that the traction control has not been terminated, the process returns to step S64. If it is determined that the engine speed is lower than the predetermined value β2, the driving returns to n-cylinder driving (step S66), and it is determined whether or not the traction control has been terminated (step S60). If it is determined that the traction control has been terminated in step S60 or step S65, the catalyst protection control is terminated. As the thresholds of the engine speed, two values which are β1 and β2 are used to prevent wrong detection, but only one value may be used.

Whereas it is determined whether or not the state where the difference between the moving average value of the ignition timing during the traction control and the moving average value of the ignition timing during the normal control under the same condition is a predetermined value α or larger continues for the time T2 or longer in step S61, cylinder operation pause control may be used when the time when the ignition timing is retarded continues for a predetermined time or longer.

The catalyst protection control is not limited to the traction control using the first slip threshold $M_1$ and the second slip threshold $M_2$ in this embodiment. That is, the catalyst protection control is applicable to all vehicles using the ignition retard control. For example, the catalyst protection control is widely applicable to vehicles having general traction control functions for retarding the ignition timing to reduce the driving power of the drive wheel to restore the drive wheel traction on the road surface, when a predetermined start condition is satisfied.

Figure 20:
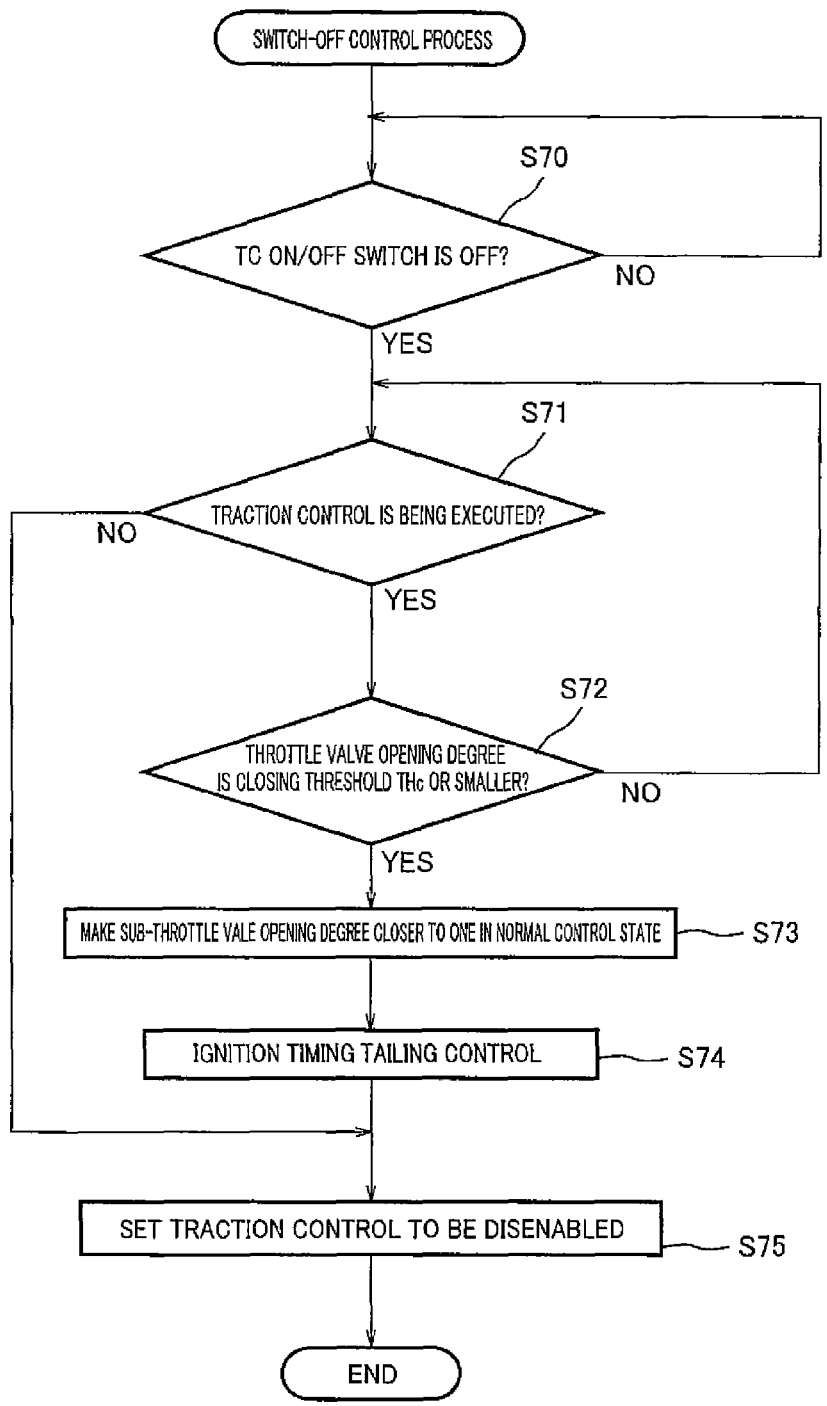
FIG. 20 is a flowchart of a switch-off control process.

FIG. 20 is a flowchart of a switch-OFF control process. The switch-OFF control process is executed when a main electric power supply (not shown) of the motorcycle 1 is in an ON-state. As shown in FIG. 20, it is determined whether or not the driver has turned OFF the traction control ON/OFF switch 40 (step S70). The OFF-operation of the traction control ON/OFF switch 40 is a command for inhibiting (nullifying) the traction control, while the ON-operation is a command for permitting (enabling) the traction control. If it is determined that the driver has turned OFF the traction control ON/OFF switch 40 (permission command has been input), it is determined whether or not the traction control is being executed (step S71). If it is determined that the traction control is not being executed, the traction control function is set to be disenabled (step S75). That is, the traction control is set so as not to be activated even if the monitored value exceeds the first slip threshold $M_1$ or the starting slip threshold $M_{ST}$.

On the other hand, if it is determined that the traction control is being executed, it is determined whether or not the throttle valve opening degree detected by the throttle valve position sensor 25 is a closing threshold THc or smaller (step S72). If it is determined that the throttle valve opening degree is larger than the closing threshold THc, the process returns to step S71. That is, if the traction control is forcibly terminated in this stage, the driving speed fluctuates because of the transition from the traction control to the normal control state. Therefore, disenabling the traction control function is deferred. At this time, the traction control unit 47 sends a signal to the display device 49. Receiving the signal, the display device 49 may conduct a display (e.g., blinking of an LED lamp) to enable the driver to know that the disenabling of the traction control function is deferred.

If the second condition is satisfied in the state where disenabling of the traction control function is deferred, that is, the throttle valve opening degree is the closing threshold THc or smaller, it is determined that the driving speed will not increase even if the control state is returned to the normal control state, and the sub-throttle valve opening degree is returned to the one in the normal control state (step S73), and the ignition timing tailing control for gradually decreasing the ignition retard angle amount with a predetermined rate and being terminated at the time point when the ignition retard angle amount reaches the one in the normal control state is executed (step S74). After the sub-throttle valve opening degree and the ignition liming reach the ones in the normal control state, the traction control is set to be disenabled (step S75). Thereby, the termination of the traction control is deferred until the throttle grip 7 is closed or the traction control is spontaneously terminated. As a result the driving speed will not increase.

In modification of the switch-OFF control process, if the traction control is being executed in the case where the traction control ON-OFF switch 40 is turned OFF, the traction control may be terminated and the traction control function may be set to be disenabled without deferring only when the second condition is satisfied, for example, when the throttle valve opening degree detected by the throttle valve position sensor 25 is the closing threshold THc or smaller. In an alternative example, only when the traction control is not being executed in the case where the traction control ON-OFF switch 40 is turned OFF, traction control may be terminated and the traction control function may be set to be disenabled, whereas when the traction control is being executed, the traction command may be nullified and this control may be continued. In a further alternative example, if the traction control is being executed when the traction control ON-OFF switch 40 is turned OFF, the traction-OFF command is deferred, and the traction control may be set to be disenabled at the time point when the traction control turns to be non-executed in the state where the command is deferred.

The operation for nullifying the traction control function associated with the traction control ON-OFF switch 40 is not limited to that for the traction control performed using the first slip threshold $M_1$ and the second slip threshold $M_2$ in this embodiment, but may be widely applicable to a general traction control for reducing the driving power of the drive wheel to restore the drive wheel traction on the road surface upon the detection of a slip state of the drive wheel.

In accordance with the configuration as described above, in the cases where the monitored value M exceeds the first slip threshold $M_1$ which is a relatively large value, the initial traction control for reducing the driving power of the rear wheel 3 by activating the brake, retarding the ignition and reducing the air-intake amount is initiated. This makes it possible to reduce the chance for wrong detection that the rear wheel 3 has slipped on the road surface R, even if the monitored value M increases for some reasons other than the occurrence of a slip. In addition, once the initial traction control starts, the initial traction control transitions to the continued traction control in which it is detected whether or not there is a slip based on the second slip threshold $M_2$ which is smaller than the first slip threshold $M_1$, because in this situation, it may be presumed that the motorcycle 1 is likely to slip. This makes it possible to avoid failure to detect a slip and to maintain the rear wheel 3 traction on the road surface R. As a result determination accuracy of the slip of the rear wheel 3 on the road surface R can be improved.

In a case where a reduction gear ratio of the transmission gear position of the transmission 14 is lower, a slip may be more likely to occur, and therefore the first slip threshold $M_1$ is set smaller an in a case where the reduction gear ratio of the transmission gear position is higher in a case where the reduction gear ratio is lower. This makes it possible to avoid failure to detect a slip more suitably. In addition, in a case where the driving speed is higher, a slip may be more likely to occur, and therefore the first slip threshold $M_1$ is set smaller than in a case where the driving speed is lower. This makes it possible to avoid failure to detect a slip more suitably. Furthermore, since the first slip threshold $M_1$ is compensated to increase as the vehicle body tilting angle θ increases in a region where the vehicle body tilting angle θ is the predetermined angle $θ_1$ or larger. This makes it possible to avoid a wrong detection that a slip has occurred in a case where a difference is generated between the rotational speed of the rear wheel 3 and the rotational speed of the front wheel 2, for example, due to the fact that the rear wheel 3 has passed over a region outward relative to a region where the front wheel 2 passes, during turn of a curve.

When the termination condition of step S25 of FIG. 6 is satisfied; the sub-throttle valve opening degree is increased gradually so that the driving power of the rear wheel 3 gradually approaches the one in the normal control state in which the traction control is not performed. Therefore, the driving power of the rear wheel 3 is not quickly returned to the one in the normal control state, and as a result, the driver can enjoy good driveability.

Whereas in this embodiment the ECU 33 for CBS (combined brake system) is used for the control of the rear wheel brake 38, an ECU for ABS may be used instead of the ECU 33 for CBS in the case of a vehicle including an ABS (anti-lock brake system). A part of calculation of the traction control which is performed by the engine ECU 17 may be performed by the ECU for CBS/ABS. In a case where the motorcycle 1 does not include the CBS, the front wheel vehicle speed sensor 34 and the rear wheel vehicle speed sensor 35 may be directly coupled to the engine ECU 17 and the brake control may not be used in the traction control.

Whereas in this embodiment, the sub-throttle valve 22 is used to control the air-intake amount in the traction control, the traction control may be performed by controlling the opening degree of the main throttle valve in the case of a motorcycle including an electronic control throttle system configured to drive the main throttle valve using an actuator.

In this embodiment, it is determined whether or not to terminate the traction control based on the condition of step S25 of FIG. 6. Alternatively, the traction control may be terminated when the monitored value M continues to be smaller than the second slip threshold $M_2$ for a predetermined time in the continued traction control.

The second slip threshold $M_2$ may be set so as to decrease with decreasing an accumulated average value of an amount of the driving power of the rear wheel 3 during the traction control which decreases from the one in the normal control state in which the traction control is not performed, for a predetermined time period. To be specific, the second slip threshold $M_2$ may be set to decrease as the accumulated average value of the ignition retard angle amount during the traction control decreases. Since it may be considered that the rear wheel 3 traction on the road surface R is being restored as the accumulated average value of the retard angle amount of the ignition timing decreases from the one in the normal control state, suppression of a slip is accomplished more suitably by setting the second slip threshold M2 so that it decreases as the accumulated average value decreases.

Whereas in this embodiment, the ignition retard, reduction of the air-intake amount and the activation of the brake are used to reduce the driving power of the rear wheel 3, the driving power of the rear wheel 3 may be reduced by pausing ignition of a part of the plural cylinders of the engine E. Alternatively, the driving power of the rear wheel 3 may be reduced by skipping the number of times of the ignition, i.e., intermittently pausing the ignition for the cylinders of the engine E. Alternatively, the driving power of the rear wheel 3 may be reduced by suitably reducing the fuel fed to the cylinders of the engine E. For example, the driving power of the rear wheel 3 may be reduced by combining the ignition retard, the ignition pause and the ignition skipping, only by the ignition retard, or by combining two of the ignition retard and the reduction of throttle valve opening degree.

The throttle device 16 is not limited to that of the embodiment, but may be an electronic control throttle device for electronically controlling the opening degree of the main throttle valve. In that case, the value obtained by subtracting an opening degree reduction amount of the sub-throttle valve in this embodiment from the opening degree of the main throttle valve in the normal control state may be used as a command for the opening degree of the main throttle valve.

Whereas in this embodiment, the driving power is controlled so that the monitored value M is made closer to the second slip threshold $M_2$ in the continued traction control, this is merely exemplary. For example, a first operation for gradually increasing the driving power with lapse of time and a second operation for rapidly reducing the driving power by a predetermined amount when the monitored value M reaches the second slip threshold $M_2$ during the first operation for increasing the driving power are repeated alternately, thereby increasing and reducing the driving power in a sawtooth shape as a whole, in a period until the driving power at the time point of initiation of the continued traction control reaches the driving power in the normal control state. Alternatively, a feed-forward control may be used to increase the driving power little by little so that the monitored value does not exceed the second slip threshold $M_2$.

In this embodiment the monitored value M is suppressed so as not to exceed the second slip threshold $M_2$ to achieve stable driving. Alternatively, the motorcycle 1 may drive such that the traction is maintained while permitting that the monitored value M is smaller than the second slip threshold $M_2$. For example, in a case where the driver drives the motorcycle 1 on a road surface of a motoring sport facility, the driver may prefer to enjoy driving while somewhat permitting a slip. In such a case, as the second slip threshold $M_2$ set in the traction control, a value which is larger than the monitored value with which the driver can explicitly recognize a slip while maintaining some traction may be used. In a further alternative, an input unit may be provided to enable the driver to select a variable value or a constant value of the second slip threshold $M_2$ by operating it.

In the switch ON/OFF control process (see FIG. 20) of this embodiment, the command for disenabling the traction control is input only by turning OFF the traction control ON/OFF switch 40. Alternatively, it may be determined that the command has been input when the switch 40 and the operation unit other than the switch 40 are operated at the same time. For example, the operation unit other than the switch 40 may be the throttle grip 7 and the traction control unit 47 may determine that the command has been input when the opening degree (operation amount) of the throttle grip 7, which is detected by the throttle valve position sensor 25, is a predetermined value or smaller and the switch 40 is turned OFF.

(Embodiment 2)

Figure 21:
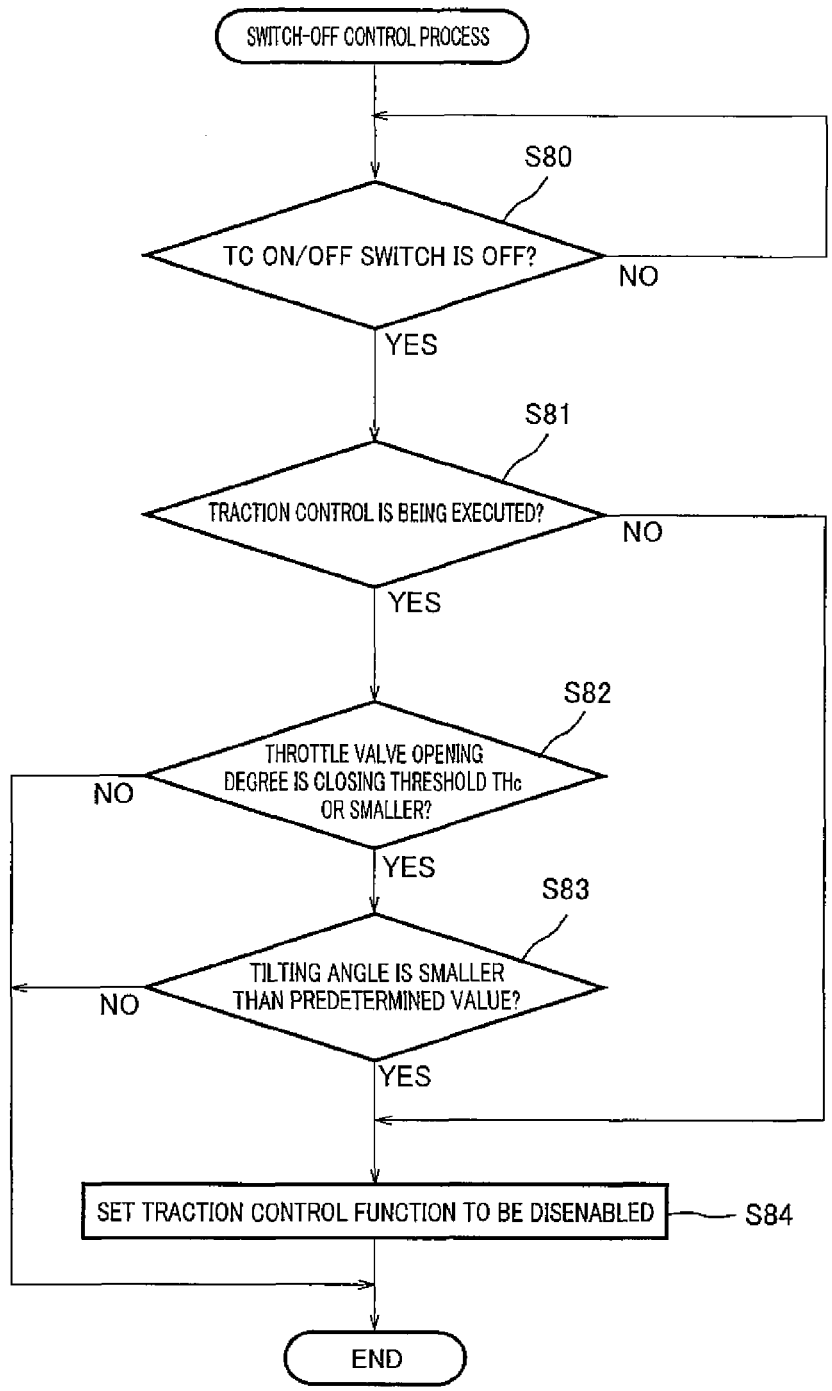
FIG. 21 is a flowchart of a switch-off control process according to Embodiment 2 of the present invention.

FIG. 21 is a flowchart of a switch-OFF control process according to Embodiment 2 of the present invention. In this embodiment, in the switch-OFF control process, the termination of the traction control is not deferred unlike the example shown in FIG. 20. As shown in FIG. 21, it is determined whether or not the driver has turned OFF the traction control ON/OFF switch 40 (step S80). If it is determined that the driver has turned OFF the traction control ON/OFF switch 40, it is determined whether or not the traction control is being executed (step S81). If it is determined that the traction control is not being executed, the traction control function is set to be disenabled (step S84).

On the other hand, if it is determined that the traction control is being executed, it is determined whether or not the throttle valve opening degree detected by the throttle valve position sensor 25 is a closing threshold THc or smaller (step S82). If it is determined that the throttle valve opening degree is larger than the closing threshold THc, it is determined that the driving power will increase and the driving speed will fluctuate if the control state is returned to the normal control state. Therefore, the command generated by the driver's OFF operation is nullified, and the traction control function is set not to be disenabled. On the other hand, if the throttle valve opening degree is the closing threshold THc or smaller, it is determined whether or not the tilting angle of the vehicle body which is detected by the tilting angle sensor 32 is smaller than a predetermined value (step S83).

If it is determined that the tilting angle is not smaller than the predetermined value (tilting angle is the predetermined angle or larger), the command generated by the driver's OFF operation is nullified, and the traction control function is set not to be disenabled. On the other hand, if it is determined that the tilting angle is smaller than the predetermined angle, it is determined that the driveability will not be affected even if the control state is returned to the normal control state, and the traction control function is set to be disenabled (step S84). The traction control being executed is forcibly terminated. In this embodiment, if it is determined as YES in step S83, the traction control is immediately forcibly terminated in step S84. Alternatively, as in step S73 and step S74, the traction control state may return to the normal control state in such a manner that the sub-throttle valve opening degree and the ignition timing are gradually returned to the ones in the normal control state. If it is determined as NO in step S82 and step S83, the traction control unit 47 may send a signal to the display device 49, which may conduct display (e.g., blinking of the LED lamp, etc.) to notify the driver that the command generated by the driver's OFF-operation has been nullified, upon the reception of the signal.

(Embodiment 3)

Figure 22:
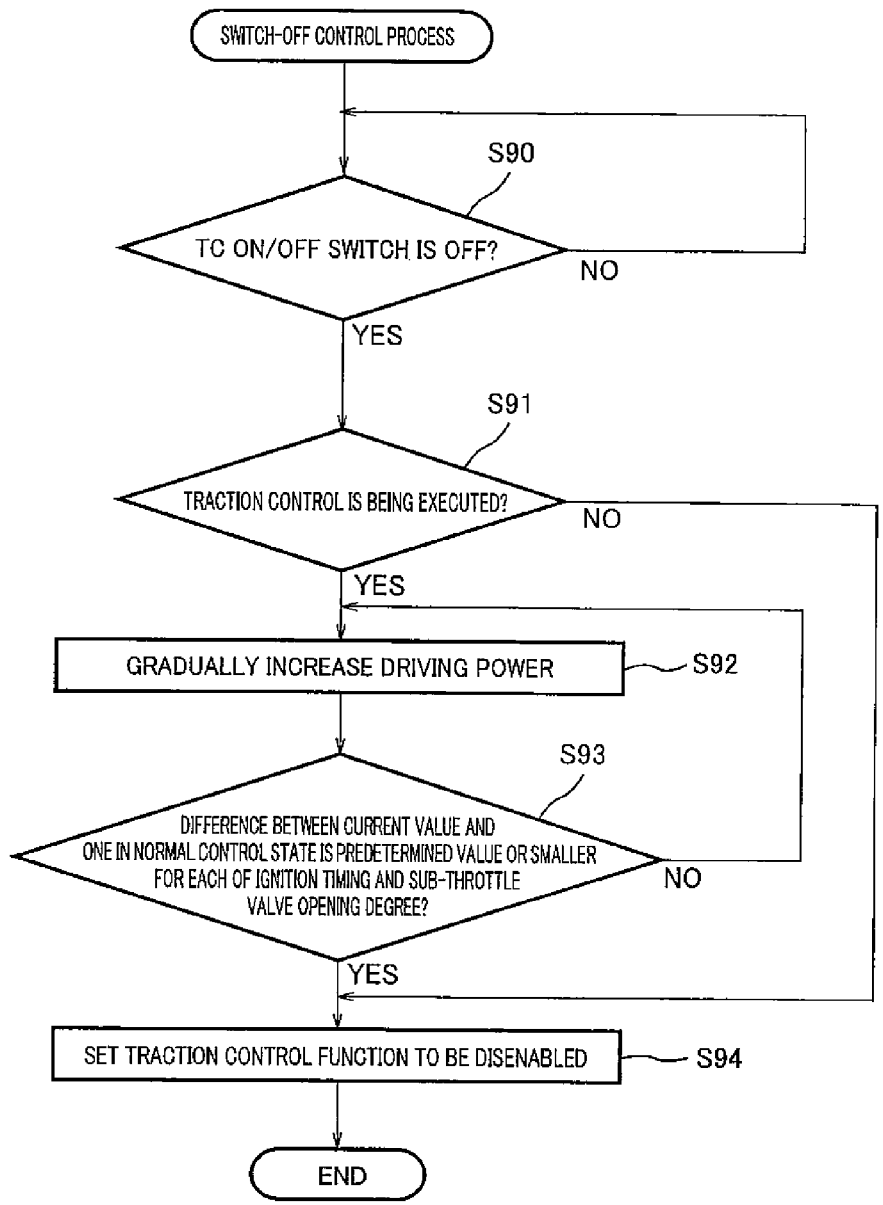
FIG. 22 is a flowchart of a switch control process according to Embodiment 3 of the present invention.

FIG. 22 is a flowchart of a switch-OFF control process according to Embodiment 3 of the present invention. As shown in FIG. 22, it is determined whether or not the driver has turned OFF the traction control ON/OFF switch 40 (step S90). If it is determined that the driver has turned OFF the traction control ON/OFF switch 40, it is determined whether or not the traction control is being executed (step S91).

If it is determined that the traction control is not being executed, the traction control function is set to be disenabled (step S94). On the other hand, if it is determined that the traction control is being executed, the driving power which has been reduced under the traction control is gradually increased (step S92). To be specific, the ignition timing and the sub-throttle valve opening degree which are the first parameters having been changed under the traction control are made gradually closer to the ones in the normal control state. Then, it is determined whether or not a difference between a current value and the one in the normal control state (traction control is not executed) is a predetermined value or smaller, for each of the ignition timing and the sub-throttle valve opening degree (step S93). If it is determined as NO in step S93, step S92 is continued. If it is determined as YES in step S93, it is determined that the second condition is satisfied assuming that the driveability will not be affected even if the control state is returned to the normal control state, and the traction control function is set to be disenabled (step S94). Since the fuel injection amount is preset to increase or decrease according to an increase or decrease in the air-intake amount in this embodiment, the first parameters substantially include the fuel injection amount.

(Embodiment 4)

Figure 23:
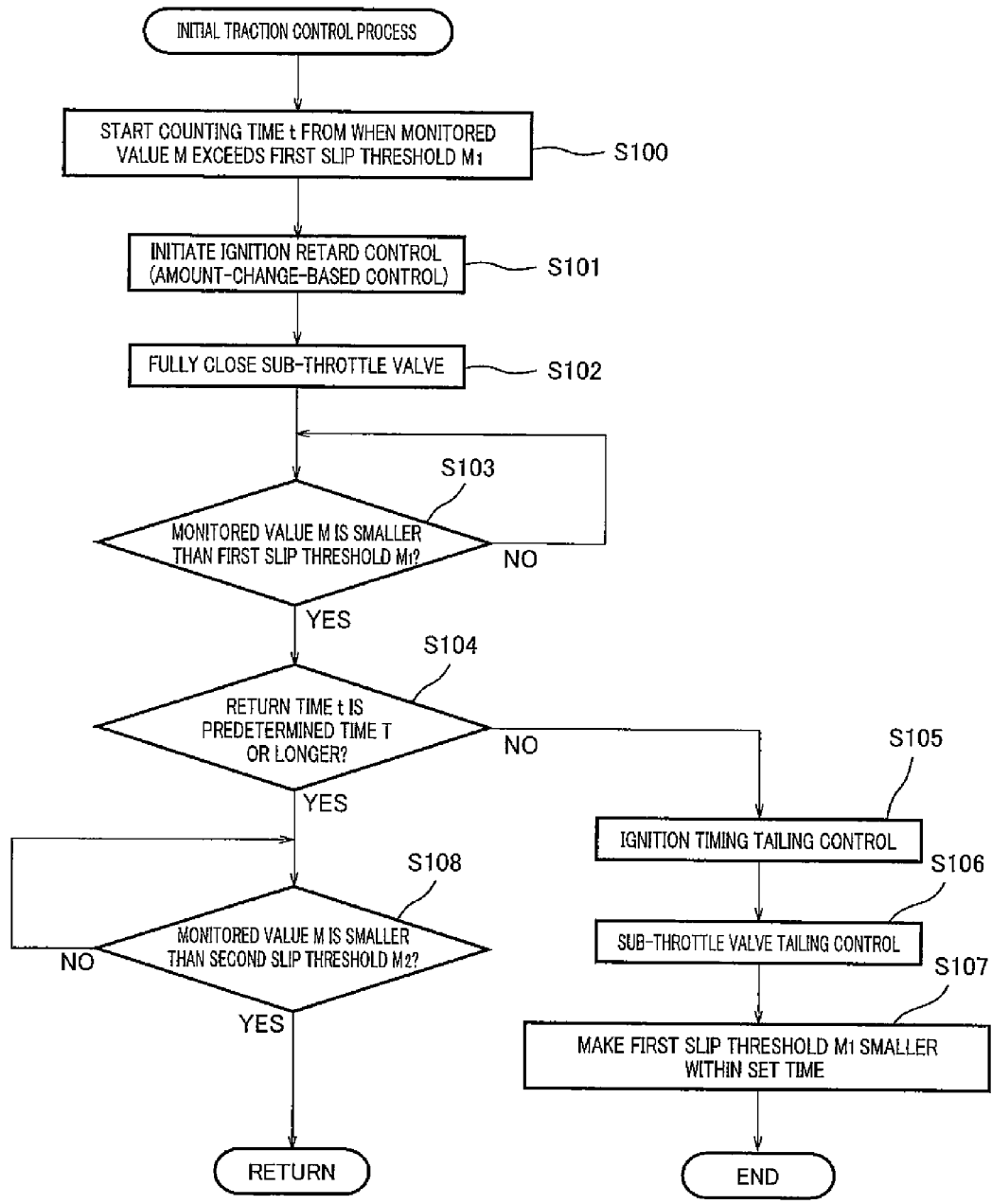
FIG. 23 is a flowchart of an initial traction control process according to Embodiment 4 of the present invention.
Figure 24:
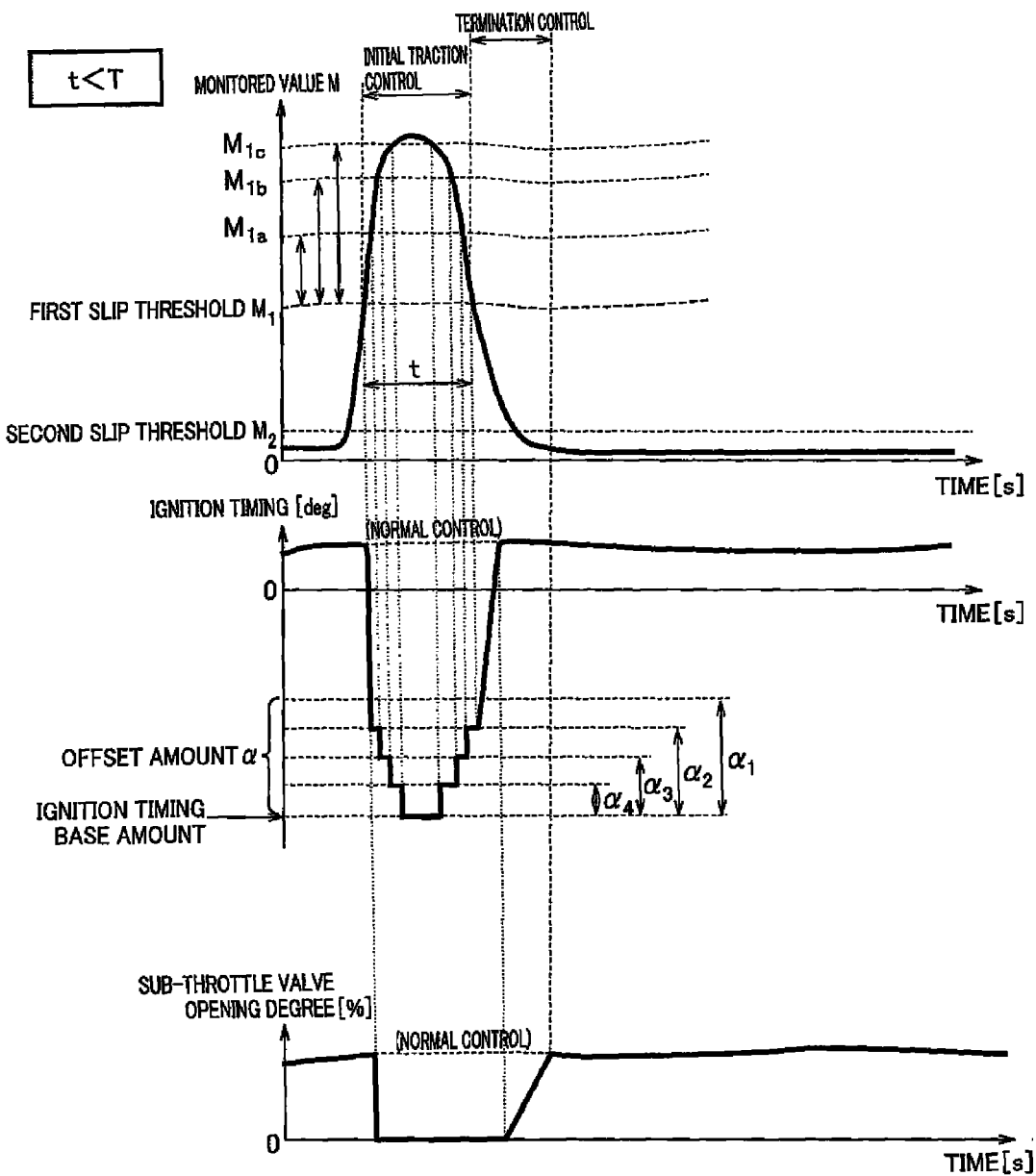
FIG. 24 is a graph and tiring chart showing the initial traction control in a case where an instantaneous slip occurs.
Figure 25:
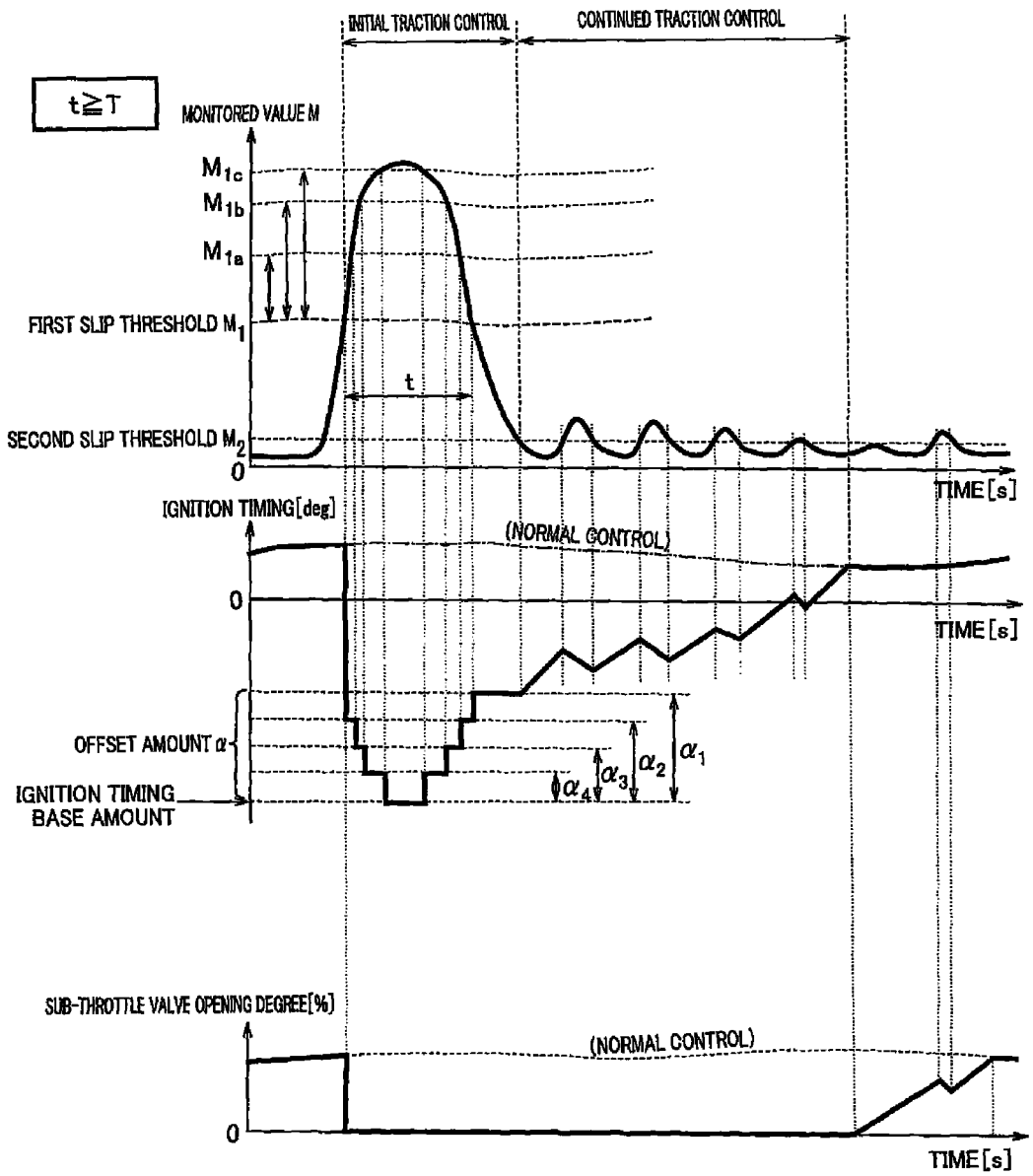
FIG. 25 is a graph and timing chart showing the initial traction control and the continued traction control in a case where a continuous slip occurs.

FIG. 23 is a flowchart of an initial traction control process according to Embodiment 4 of the present invention. FIG. 24 is a graph and timing chart showing the initial traction control in a case where an instantaneous slip occurs. FIG. 25 is a graph and liming chart showing the initial traction control and the continued traction control in a case where a continuous slip occurs. As shown in FIGS. 23 to 25, when the monitored value M exceeds the first slip threshold $M_1$, the initial traction control is initiated and the time t is counted from the time point when the monitored value M exceeds the first slip threshold $M_1$ (step S100). The traction control unit 47 initiates the ignition retard control (step S101), and causes the sub-throttle valve opening degree to reach a fully closed opening degree (step S102), in order to reduce the driving power of the rear wheel 3.

The ignition retard control in step S101 is an amount-change-based control for changing the ignition tiling in a stepwise manner based on the magnitude relationship between the monitored value M and plural thresholds $M_1$, $M_{1a}$, $M_{1b}$, and $M_{1c}$ ($M_1 < M_{1a} < M_{1b} < M_{1c}$). The ignition retard control (amount-change-based control) is initiated in the initial traction control just after the initiation of the traction control. The ignition liming in the ignition retard control is calculated in the following formula 2.

The ignition timing=ignition timing base amount+ offset amount α  [Formula 2]

Figure 26:
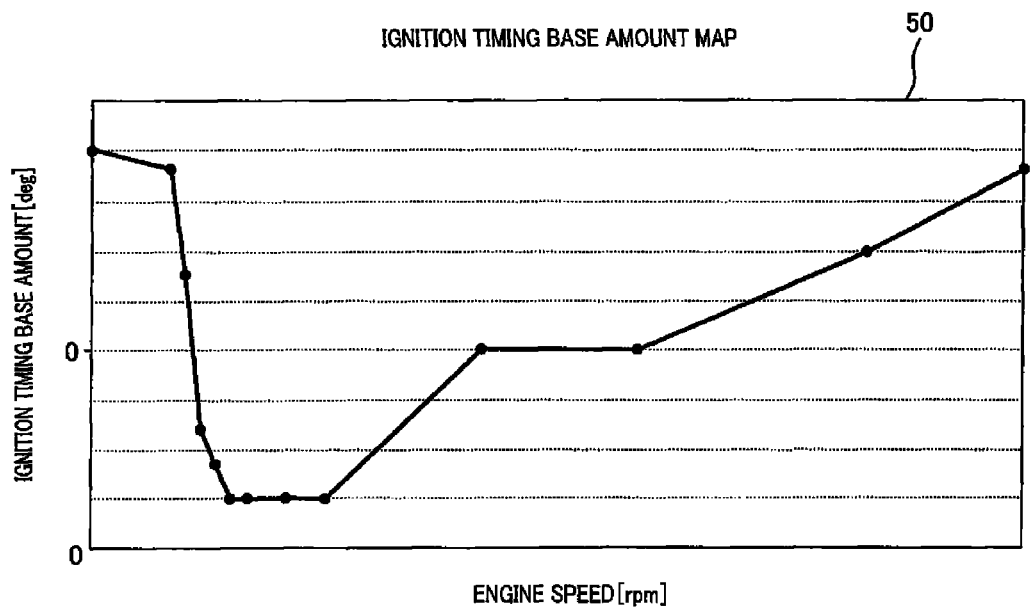
FIG. 26 is an ignition timing base amount map used for determining a retard angle amount in the initial traction control shown in FIGS. 24 and 25.

The ignition liming base amount is determined based on the ignition timing base amount map 50 of FIG. 26. The ignition timing base amount map 50 is pre-stored in the traction control unit 47. The ignition timing base amount for allowing the ignition to put forward is set to vary according to the engine speed. The ignition timing is expressed as a crank angle. The crank angle is zero when the piston of the engine E in a combustion stroke is at a top dead center. To be specific, the ignition timing base amount is set so as to gradually decrease and then gradually increase as the engine speed increases. In other words, the ignition retard angle amount is set so as to gradually increase and then gradually decrease as the engine speed increases. The ignition timing base amount for allowing the ignition to put forward is set larger in a low engine speed range in order to prevent an engine stall which would be caused by increasing the retard angle to excess. The ignition timing base amount is set larger in a high engine speed range in order to prevent an event in which the driving speed fluctuates by increasing the retard angle to excess and the driveability is degraded.

The offset amount α is determined based on the magnitude relationship between the monitored value M and thresholds $M_1$, $M_{1a}$, $M_{1b}$, and $M_{1c}$. To be specific, when the monitored value M is smaller than the threshold $M_1$, the offset amount α is a first offset value α1. When the monitored value M is larger than the threshold $M_1$ and not larger than the threshold $M_2$, the offset amount α is a second offset value α2 which is smaller than the first offset value α1. When the monitored value M is larger than threshold $M_2$ and not larger than the threshold $M_3$, the offset amount α is a third offset value α3 which is smaller than the second offset value α2. When the monitored value M is larger than the threshold $M_3$ and not larger than the threshold $M_4$, the offset amount α is a fourth offset value α4 which is smaller than the third offset value α3. When the monitored value M is larger than the threshold $M_4$, the offset amount α is zero (α1>α2>α3>α4>0). During a time period in which the magnitude relationship between the monitored value M and plural thresholds $M_1$, $M_{1a}$, $M_{1b}$, and $M_{1c}$ is not varied, the ignition timing is controlled to have a constant value.

In accordance with the amount-change-based control as described above, if the monitored value M exceeds the first slip threshold $M_1$ by a small amount, then the retard angle amount becomes small. Therefore, the driving power suppression amount is small and a fluctuation in the driving speed can be suppressed when the traction control is initiated. In the formula 2, the ignition timing base amount is set as an ignition timing minimum value (maximum retard angle value) in the ignition retard control, and then the offset amount α is added to obtain the ignition timing. Alternatively, the ignition timing base amount may be set as an ignition timing maximum value (minimum retard angle value) in the ignition retard control, and then the offset amount α may be subtracted from the ignition timing maximum value to obtain the ignition timing. Whereas in this embodiment, the ignition timing is used as the parameter for the amount-change-based control, the sub-throttle valve opening degree and the fuel injection amount may be used as the parameters for the amount-change-based control in the initial traction control. The ignition timing base amount may be changed based on the information detected by the throttle valve position sensor 25 or the gear position sensor 29.

Figure 27:
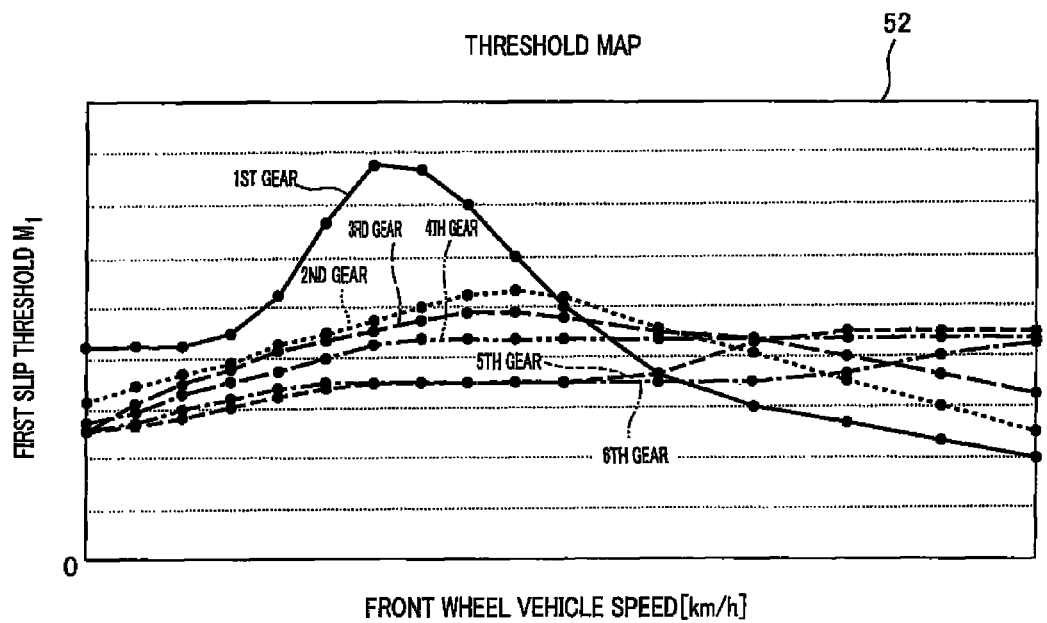
FIG. 27 is a threshold map used for determining the first slip threshold shown in FIGS. 24 and 25.

The first slip threshold $M_1$ is determined based on the threshold map 52 shown in FIG. 27. The threshold map 52 is pre-stored in the threshold determiner unit 46. The first slip threshold $M_1$ is set to vary according to the front wheel vehicle speed (vehicle body speed) detected by the front wheel vehicle speed sensor 34 and the transmission gear position detected by the gear position sensor 29. When the vehicle body is tilted (banked) to the right or to the left, the motorcycle 1 is driving using a medium speed range including a power band. Further a characteristic of tire traction is there is a tendency that a difference exists between the rotational speed of the front wheel 2 and the rotational speed of the rear wheel 3 and the monitored value M is large, even though no slip occurs actually. In addition, in the power band of the engine E, the rear wheel 3 which is a drive wheel is pressed strongly against the road surface and is deformed, making the outer diameter of the rear wheel 3 smaller. As a result, the value of ($V_R$-$V_F$) in the formula 1 tends to be large, that is, the monitored value M tends to be large, even though no slip occurs. Accordingly, it is devised so that the traction control is not initiated when no slip occurs, by setting the first slip threshold $M_1$ larger in a condition corresponding to the power band. As used herein, the term "power band" refers to an engine speed range in which the engine is capable of operating most efficiently, and is typically a range between an engine speed at which a maximum torque of the engine is generated and an engine speed at which a maximum hose power is generated.

To be specific, in the threshold map 52, the first slip threshold $M_1$ is set to gradually increase up to a peak and then gradually decrease as the front wheel vehicle speed increases in a transmission gear position which is a predetermined value or smaller (e.g., 3rd gear or lower). That is, the first slip threshold $M_1$ is set so that it is difficult to initiate the traction control in a medium speed range. This tendency is especially noticeable in the 1st gear. This is because the peak of the torque of the engine E is formed in the medium speed range and the value of ($V_R$-$V_F$) in the formula 1 tends to be large and the monitored value M tends to be large due to the vehicle body banking or the tire deformation even though no slip occurs.

The threshold map 52 is set so that the front wheel vehicle speed corresponding to the peak of the first slip threshold $M_1$ corresponding to a transmission gear position (e.g., 1st gear) of a predetermined value or lower is lower than the front wheel vehicle speed corresponding to the peak of the first slip threshold $M_1$ corresponding to a 2nd or 3rd gear which is higher than the 1st gear. This is because, in a property of the engine E, the vehicle speed at which the torque peak is generated in the 1st gear which is the lowest gear position is lower than the vehicle speeds at which the torque peaks are generated in the 2nd gear and 3rd gear and the peak of the first slip threshold $M_1$ is set according to the torque peak.

The threshold map 52 is set so that the peak value of the first slip threshold $M_1$ corresponding to 1st gear is larger than the peak value of the first slip threshold $M_1$ corresponding to 2nd or higher gear. This is because the peak value of the torque corresponding to 1st gear is larger than the peak values of the torques corresponding to other gear positions, and the peak of the first slip threshold $M_1$ is set according to the peak value.

The threshold map 52 is set so that in a gear position which is lower than a predetermined value (e.g., 5th gear or lower), the first slip threshold $M_1$ is larger in a lower gear position than in a higher gear position in a low-speed range of the front wheel vehicle speed and is larger in a higher gear position than in a lower gear position in a high-speed range of the front wheel vehicle speed. This is because the torque property has a similar tendency and the magnitude of the first slip threshold $M_1$ is set so as to correspond to the magnitude of the torque. In the threshold map 52 of FIG. 27, a horizontal axis indicates the front wheel vehicle speed. Alternatively, a horizontal axis may indicate the engine speed or the driving speed. In that case, also, the first slip threshold $M_1$ may be set to have a similar tendency.

The configuration for changing the start slip threshold $M_1$ according to the transmission gear position is not limited to that of the traction control in this embodiment. This configuration is widely applicable to general traction control for reducing the driving power of the drive wheel to restore drive wheel traction on the road surface upon the detection of a slip of the drive wheel.

Turning back to FIG. 23, after step S101 and step S102, it is determined whether or not the monitored value M is smaller than the first slip threshold $M_1$ (step S103). If it is determined that the monitored value M is smaller than the first slip threshold $M_1$, the time t at this time point is a predetermined time T or longer (step S104). That is, the length of return time t that lapses from when the monitored value M exceeds the first slip threshold $M_1$ until the monitored value M becomes smaller than the first slip threshold $M_1$ is determined. Note that the threshold for specifying the end point of the return time t may not be equal to the first slip threshold $M_1$ but a different threshold may instead be provided.

The predetermined time T may be set for each transmission gear position detected by the gear position sensor 29. For example, the predetermined time T corresponding to 2nd gear which is higher than 1st gear may be set shorter than the predetermined time T corresponding to 1st gear. The predetermined time T may be individually set for each vehicle speed detected by the front wheel vehicle speed sensor 34. For example, the predetermined time T corresponding to the 2nd gear which is higher than the 1st gear may be shorter than the predetermined time T corresponding to the 1st gear. Thus, it is determined whether or not to continue traction control in view of a driving distance corresponding to the return time t. Alternatively the predetermined time T may be set according to a driving power property of the engine E during driving.

As shown in FIG. 24, if it is determined that the return time t is shorter than the predetermined time T, it is determined that an instantaneous slip has occurred because, for example, the motorcycle 1 is driving over a wet manhole or a gap of the road surface and therefore traction control should be terminated. Then, the termination control for the traction control is performed without transitioning to the continued traction control. To be specific, in the termination control, ignition timing tailing control for gradually putting forward the ignition timing to allow the control state to smoothly transition to the normal control state (step S105) and sub-throttle valve fling control for gradually increasing the sub-throttle valve opening degree to allow the control state to smoothly transition to the normal control state (step S106) are performed Note that in step S105 and step S106, for example, an increase rate of the ignition timing and an increase rate of the throttle valve opening degree per unit time may be changed according to at least one parameter among the vehicle body speed (front wheel vehicle speed), the transmission gear position and the vehicle body tilting angle.

The first slip threshold $M_1$ is made smaller than before within a predetermined set time from when it is determined that the return time t is shorter than the predetermined time T (step S107). That is, the first slip threshold $M_1$ within the set time is set smaller than the first slip threshold $M_1$ outside the set time. Thus, even if it is determined as NO in step S104 when the slip is not instantaneous, which is a wrong determination, the traction control can be easily initiated and the drive wheel traction on the road surface can be quickly restored.

On the other hand, as shown in FIG. 25, if it is determined that the return time t is the predetermined time T or longer, the termination control is not executed. But instead, it is determined whether or not the monitored value M is smaller than the second slip threshold $M_2$ (step S108). If it is determined that the monitored value M is not smaller than the second slip threshold $M_2$, step S108 is repeated. If it is determined that the monitored value M is smaller than the second slip threshold $M_1$, the initial traction control process is terminated and the process returns to the main process of FIG. 4 and transitions to the continued traction control (step S7).

In the above embodiment, it is determined whether or not to terminate the traction control only based on the return time t. The traction control may be terminated if a driving distance obtained by multiplying the return time t by a current vehicle speed is smaller than a predetermined value, whereas the traction control may be continued if the driving distance is a predetermined value or larger.

In the continued traction control of this embodiment, a feedback gain in the ignition timing feedback control changes according to the engine speed and the throttle valve opening degree. That is, the traction control unit 47 compensates the feedback gain according to the information detected by the engine speed sensor 30 and the throttle valve position sensor 25. To be specific, an ignition timing feedback gain G is calculated based on a formula 3 illustrated below. $G_0$ indicates a gain base amount, $C_{rpm}$ indicates an engine speed compensation coefficient, and $C_{th}$ indicates a throttle compensation coefficient $$G=G_0 \cdot C_{rpm} \cdot C_{th} \qquad \text{[Formula 3]}$$

The gain base amount $G_0$ is determined according to the deviation between the monitored value M and the second slip threshold $M_2$ (target value) and set so that an absolute value of a change rate of the ignition timing per unit time increases as the deviation increases. The throttle compensation coefficient $C_{th}$ is set so as to increase as the throttle valve opening degree increases. The feedback gain G changes according to the driver's operation of the throttle grip 7. The engine speed compensation coefficient $C_{rpm}$ is suitably set according to the engine property.

(Embodiment 5)

Figure 28:
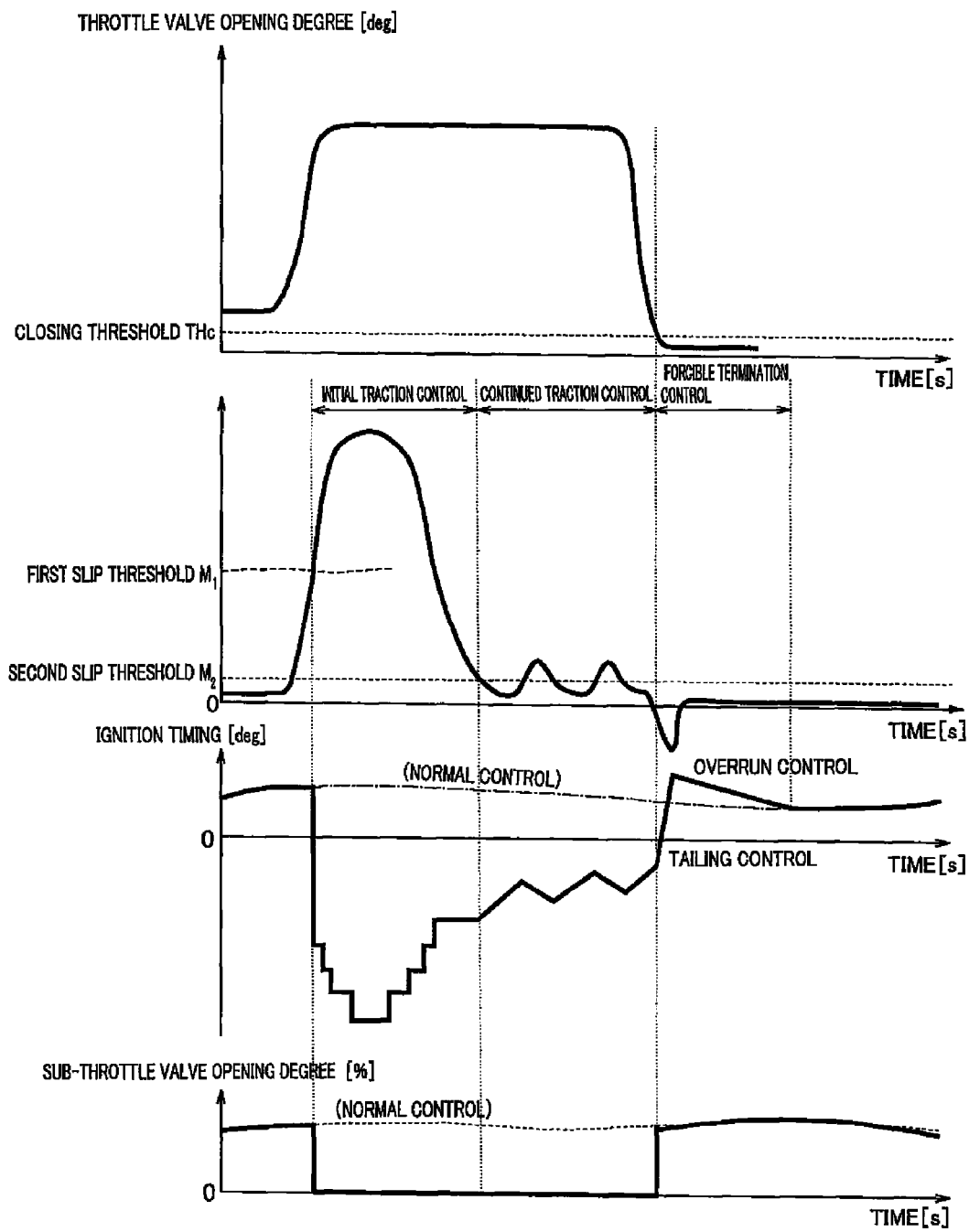
FIG. 28 is a graph and timing chart of a forcible termination control process in a state where an engine speed is slow according to Embodiment 5 of the present invention.
Figure 29:
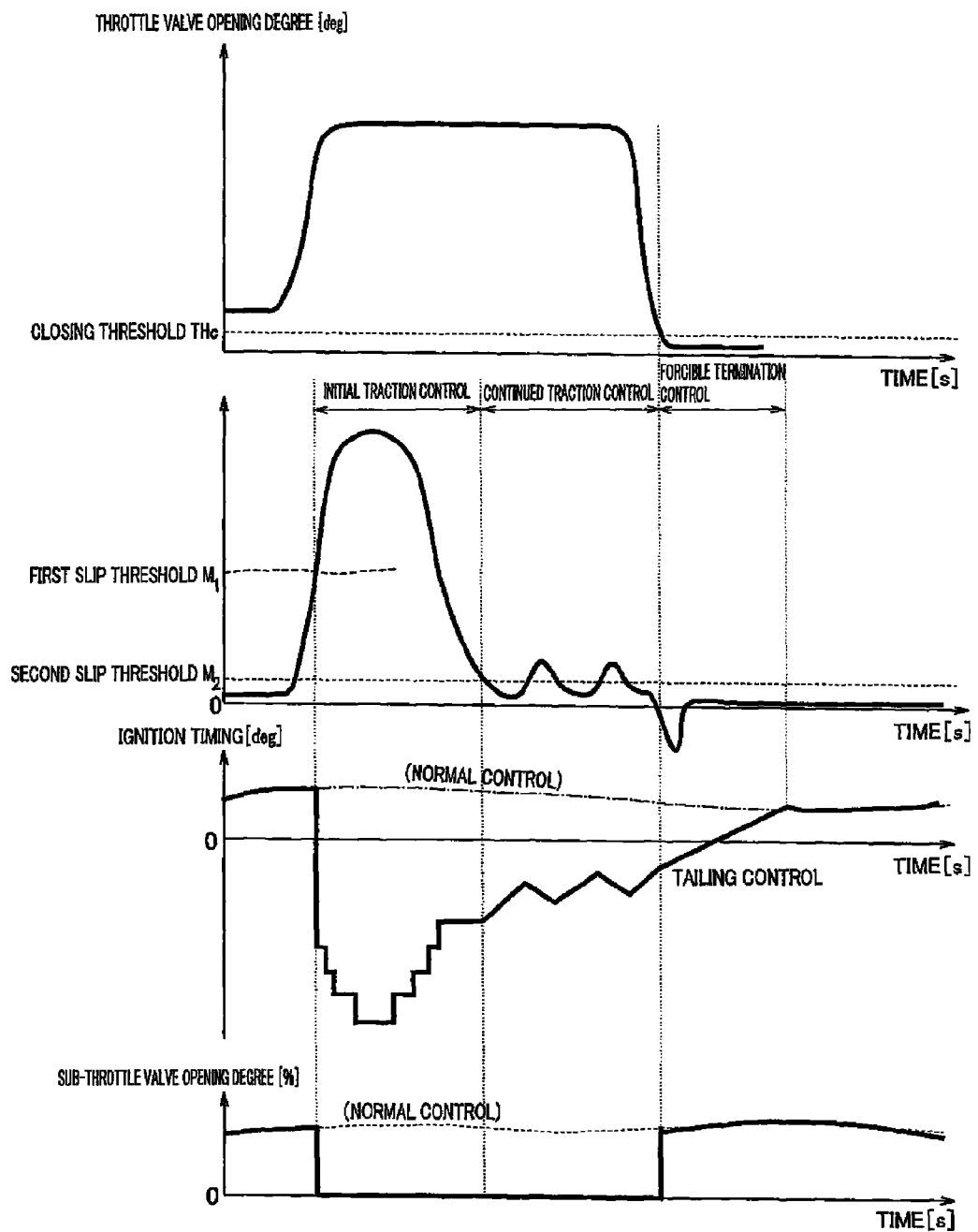
FIG. 29 is a graph and timing chart of the forcible termination control process in a state where an engine speed is high according to Embodiment 5 of the present invention.

FIG. 28 is a graph and timing chart of the forcible termination control process in a state where the engine speed is low according to Embodiment 5 of the present invention. FIG. 29 is a graph and timing chart of the forcible termination control process in a state where the engine speed is high according to Embodiment 5 of the present invention. In this embodiment, a method of returning the ignition timing to the one in the normal control stare by the forcible termination control is made different according to the engine speed. That is, in this embodiment, step S53 is different from step S53 in FIG. 16. The initial traction control and the continued traction control are similar to those of Embodiment 4.

As shown in FIG. 28, when the engine speed is a low engine speed lower than a predetermined value, tailing control for gradually putting forward the ignition timing with lapse of time is executed as the forcible termination control if it is determined that the throttle valve opening degree detected by the throttle valve position sensor 25 is the closing threshold THc or smaller when the traction control is being executed. In this case, an increase rate of a put-forward angle amount of the ignition timing per unit time is set larger than an increase rate in the example shown in FIG. 29 at which the engine speed is a predetermined value or higher.

Then, overrun control is executed in such a manner that the ignition timing continues to be put forward up to one which is forward relative to the one in the normal control state after the ignition timing has returned to the one in the normal control state by the tailing control, then the ignition timing is returned to the one in the normal control state and the traction control is terminated. In the overrun control, the ignition timing is caused to be retarded gradually with lapse of time when returning the ignition timing from the value which is forward relative to the value of the ignition timing in the normal control state to one in the normal control state. In this manner, when the engine speed is low, the tailing control and the overrun control are used to quickly increase the driving power, thereby preventing occurrence of the engine stall.

On the other hand, as shown in FIG. 29, in a case where the engine speed is a high engine speed which is a predetermined value or higher, only the tailing control is used without using the overrun control, for the ignition timing. Since the increase rate of the put-forward angle amount of the ignition timing per unit time in this case is set smaller than that shown in FIG. 28 in the case where the engine speed is lower than a predetermined value, a fluctuation in the driving speed is suppressed and good driveability is maintained.

(Embodiment 6)

Figure 30:
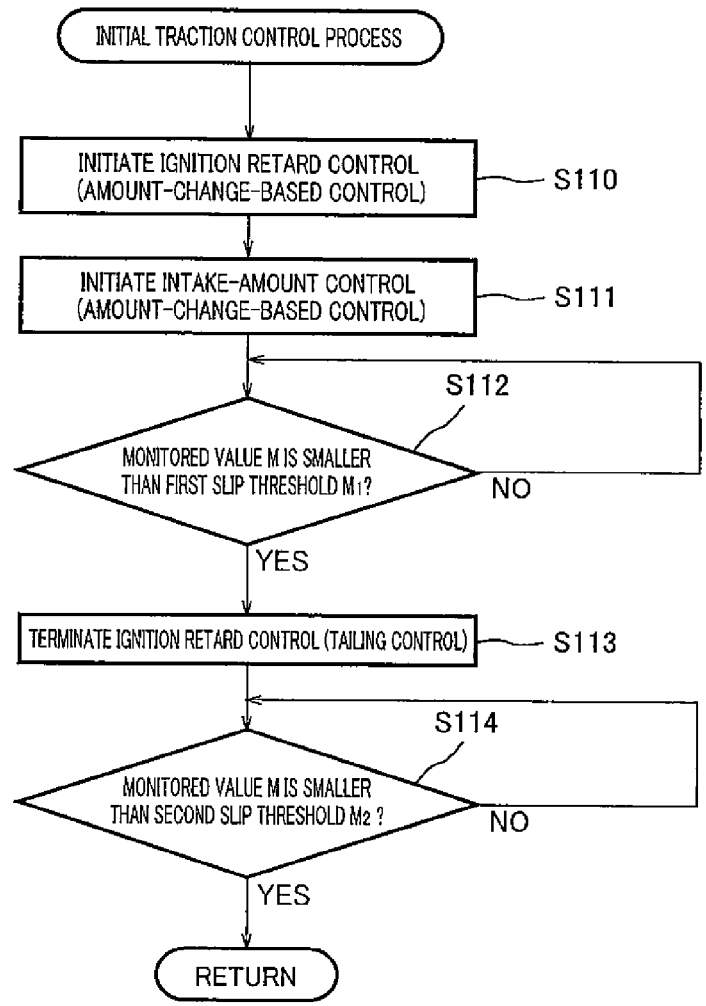
FIG. 30 is a flowchart of an initial traction control process according to Embodiment 6 of the present invention.
Figure 31:
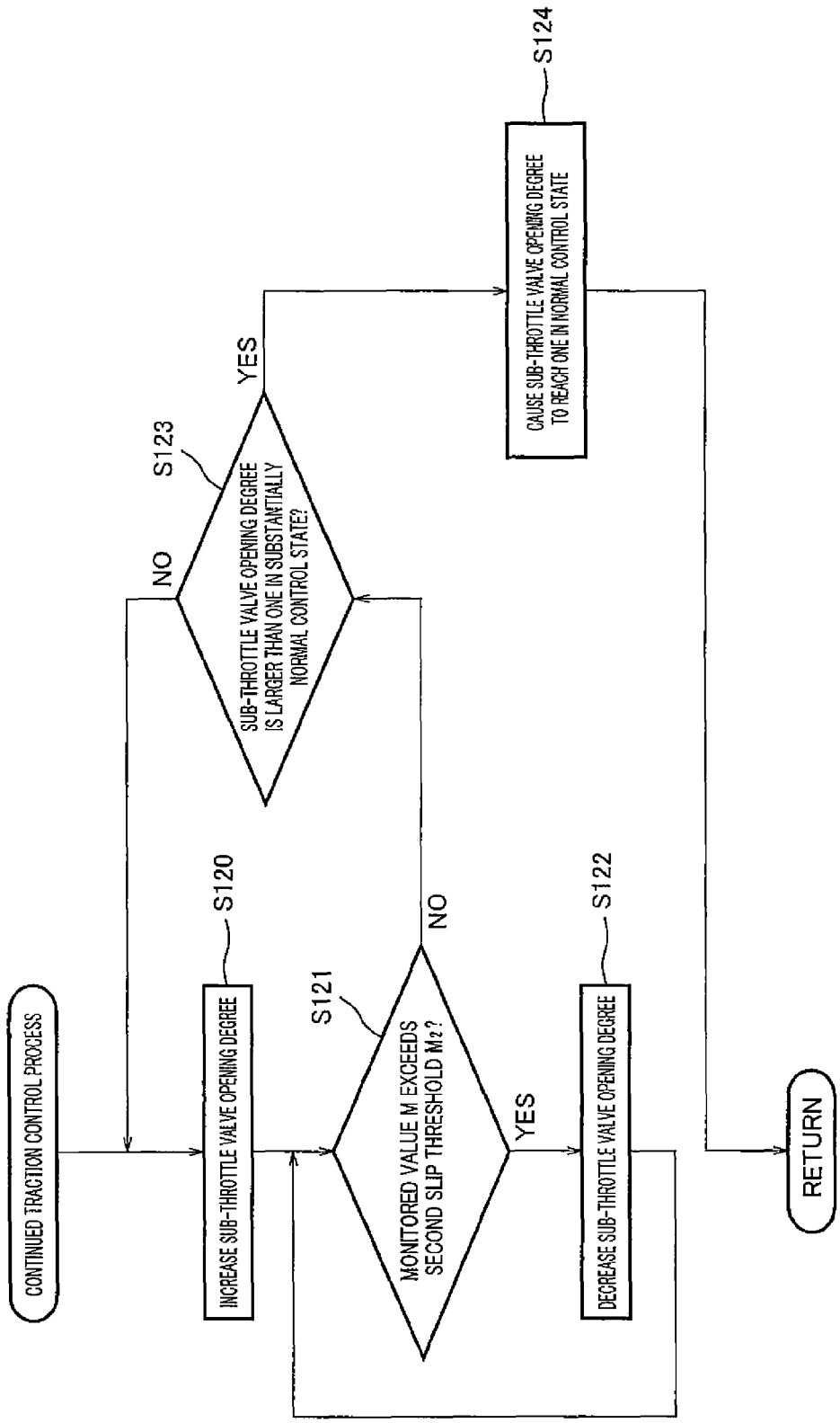
FIG. 31 is a flowchart of a continued traction control process according to Embodiment 6 of the present invention.
Figure 32:
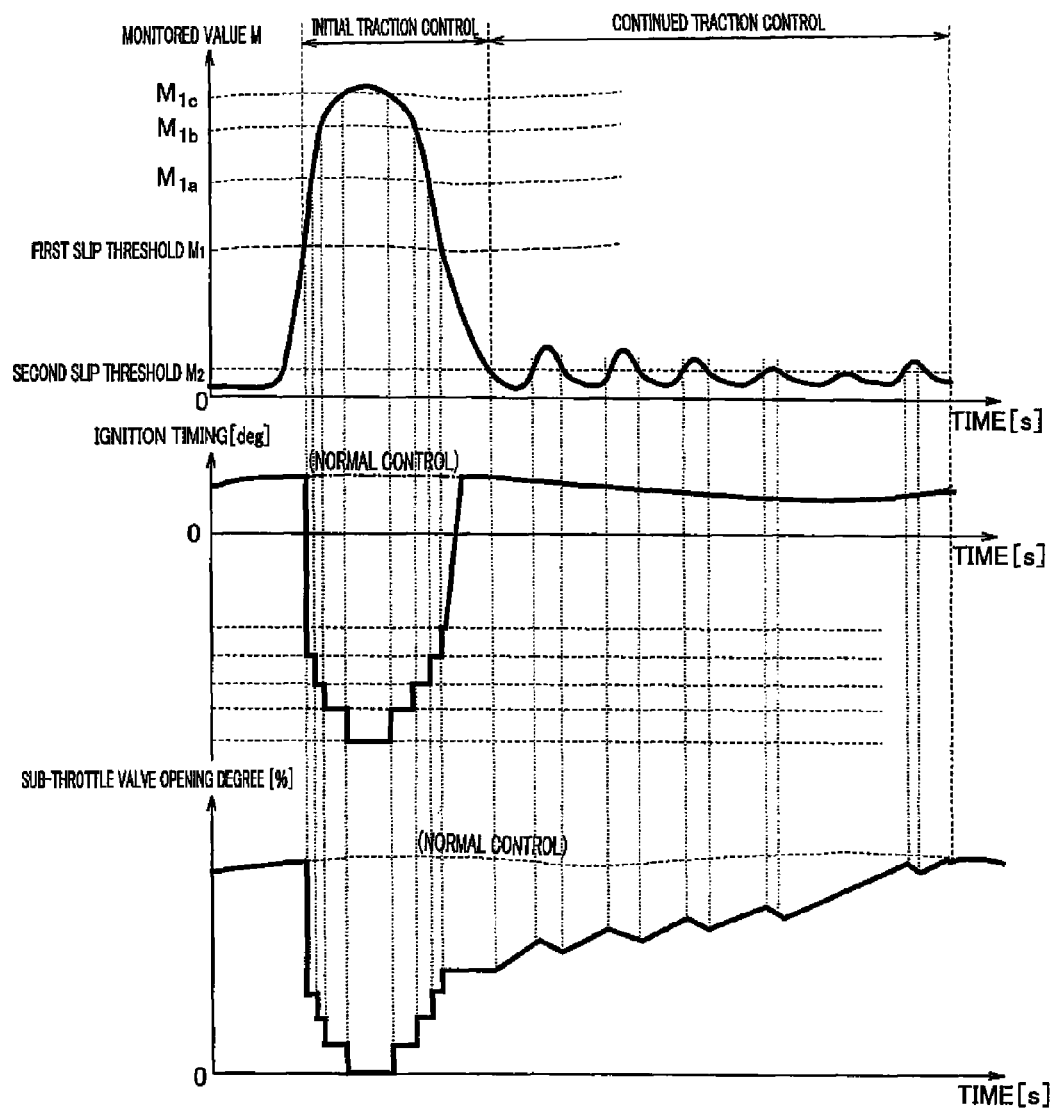
FIG. 32 is a graph and timing chart showing a control process shown in FIGS. 30 and 31.

FIG. 30 is a flowchart of an initial traction control process according to Embodiment 6 of the present invention. FIG. 31 is a flowchart of a continued traction control process according to Embodiment 6 of the present invention. FIG. 32 is a graph and timing chart showing the control processes shown in FIGS. 30 and 31. In this embodiment the sub-throttle valve opening degree is positively controlled in the traction control. As shown in FIGS. 30 and 32, in the initial traction control, the ignition retard control is executed to reduce the driving power (step S110). The ignition retard control is similar to that in step S101 of Embodiment 4. Simultaneously, the air-intake amount control is executed to reduce the driving power (step S111).

The air-intake amount control has the same principle as that of the ignition retard control in step S101 of Embodiment 4 and is the amount-change-based control for changing the throttle valve opening degree in a stepwise manner based on the magnitude relationship between the monitored value M and plural thresholds $M_1$, $M_{1a}$, $M_{1b}$, and $M_{1c}$. In this case, the sub-throttle valve opening degree determined based on the magnitude relationship between the monitored value M and the thresholds $M_1$, $M_{1a}$, $M_{1b}$, and $M_{1c}$ may be set to be varied according to the engine speed, the main throttle valve opening degree, the transmission gear position, the front wheel vehicle speed, etc. For example, the sub-throttle valve opening degree may be increased when the engine speed, the main throttle valve opening degree, the transmission gear position and the front wheel vehicle speed are increased, thereby suppressing a fluctuation in the speed during high-speed driving.

Then, it is determined whether or not the monitored value M is smaller than the first slip threshold (step S112). If it is determined that the monitored value M is not smaller than the first slip threshold, step S112 is repeated and the ignition retard control (step S110) and the air-intake amount control (step S111) are continued. When it is determined that monitored value M becomes smaller than the first slip threshold, the ignition retard control is terminated (step S113). At the termination of the ignition retard control, the tailing control for gradually putting forward the ignition timing to the one in the normal control state is executed. Then it is determined whether or not the monitored value M is smaller than the second slip threshold $M_2$ (step S114). If it is determined that the monitored value M is not smaller than the second slip threshold $M_2$, step S114 is repeated. If it is determined that the monitored value M becomes smaller than the second slip threshold $M_2$, the initial traction control process is terminated and transitions to the continued traction control.

As shown in FIG. 31, in the continued traction control, the feedback control of the sub-throttle valve opening degree is executed. To be specific, initially, the sub-throttle valve opening degree is increased up to one close to the opening degree in the normal control state (step S120). Then, it is determined whether or not the monitored value M exceeds the second slip threshold $M_2$ (step S121). If it is determined that the monitored value M exceeds the second slip threshold $M_2$, the sub-throttle valve opening degree is decreased (step S122) and the process returns to step S121.

If it is determined that the monitored value M does not exceed the second slip threshold $M_2$, it is determined whether or not the sub-throttle valve opening degree is larger than the opening degree in the substantially normal control state (step S123). If it is determined that the sub-throttle valve opening degree is not larger than the opening degree in the substantially normal control state, the process returns to step S120 and the sub-throttle valve opening degree is increased toward the one in the normal control state. If it is determined that the sub-throttle valve opening degree is larger than the opening degree in the normal control state, then the process returns to the main process (see FIG. 4) and thus the traction control is terminated (step S124).

In accordance with the above, since the ignition retard with high responsiveness is performed in the initial traction control just after the traction control is initiated, the driving power can be reduced quickly. In addition, in the continued traction control, the driving power is reduced by the air-intake amount control without the ignition retard. This makes it possible to reduce a burden placed in the catalyst provided in the exhaust system, and to suppress reduction of fuel efficiency.

Figure 33:
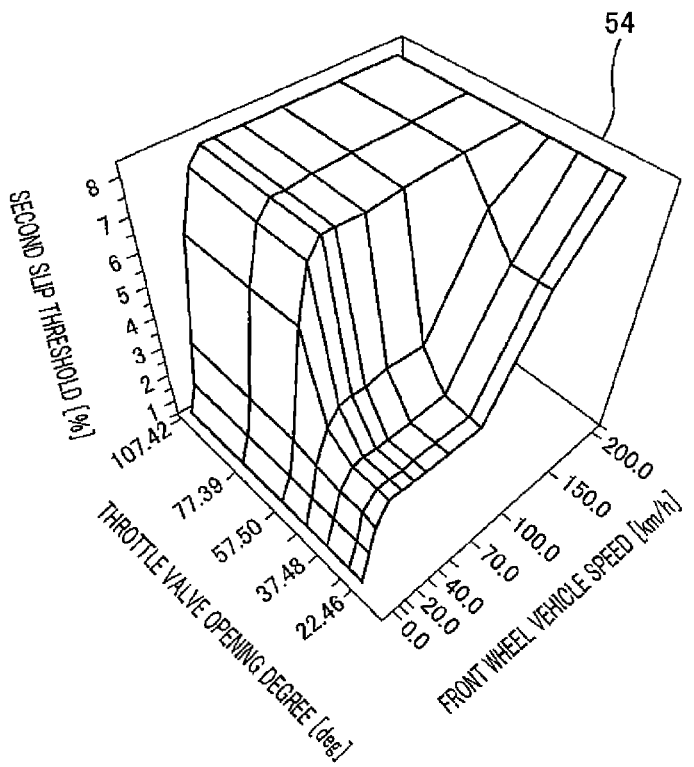
FIG. 33 is a three-dimensional map used for determining a second slip threshold.

FIG. 33 is a three-dimensional map used for determining the second slip threshold. In the above embodiments, the second slip threshold $M_2$ used in the continued traction control is constant but may be varied according to the situation. To be specific, as shown in FIG. 33, a three-dimensional threshold map 54 in which the second slip threshold $M_2$ is varied according to the front wheel vehicle speed (vehicle body speed) detected by the front wheel vehicle speed sensor 34 and the throttle valve opening degree detected by the throttle valve opening degree 25 is pre-stored in the threshold determiner unit 46 (see FIG. 3).

The three-dimensional threshold map 54 has a region in which the second slip threshold Ma is set to gradually increase as the front wheel vehicle speed increases in a throttle valve opening degree which is smaller than a predetermined throttle valve opening degree (e.g., 50 deg). To be specific, the second slip threshold $M_2$ increases as the front wheel vehicle speed increases when the front wheel vehicle speed is in a low-speed range (e.g., 0 to 30 km/h), the second slip threshold $M_2$ is substantially constant as the front wheel vehicle speed increases when the front wheel vehicle speed is in a medium-speed range (e.g., 30 to 140 km/h), and the second slip threshold $M_2$ increases as the front wheel vehicle speed increases when the front wheel vehicle speed is in a high-speed range (e.g., 140 km/h or higher). The second slip threshold $M_2$ increases as the front wheel vehicle speed increases when the front wheel vehicle speed is in a low-speed range with a predetermined throttle valve opening degree (e.g., 50 deg) or larger, while the second slip threshold $M_2$ is substantially constant as the front wheel vehicle speed increases when the front wheel vehicle speed is in a medium-to-high speed range (e.g., 30 km/h or higher).

In the three-dimensional threshold map 54, the second slip threshold $M_2$ is set smaller than a predetermined value (e.g., 3%) irrespective of the throttle valve opening degree when the front wheel vehicle speed is in a low-speed range which is lower than a predetermined value (e.g., 30 km/h). This enables easier traction of the rear wheel 3 (drive wheel) on the road surface when the motorcycle 1 is driving at a low-speed, thereby achieving smooth starting. Furthermore, the three-dimensional threshold map 54 has a region in which the second slip threshold $M_2$ is set to gradually increase as the throttle valve opening degree increases in a predetermined front wheel vehicle speed range (e.g., 30 km/h or higher). To be specific, the second slip threshold $M_2$ is substantially constant when the throttle valve opening degree is in a smaller opening degree range (e.g., smaller than 35 deg), while the second slip threshold $M_2$ increases as the throttle valve opening degree increases in an intermediate opening degree range (e.g., 35 to 55 deg), and the throttle valve opening degree is substantially constant in a high opening degree range (e.g., 55 deg or larger). The reason why the second slip threshold $M_2$ is caused to increase as the throttle valve opening degree increases is that the throttle valve opening degree detected by the throttle valve position sensor 25 is associated with the driver's throttle grip operation which is performed according to the driver's intention.

Figure 34:
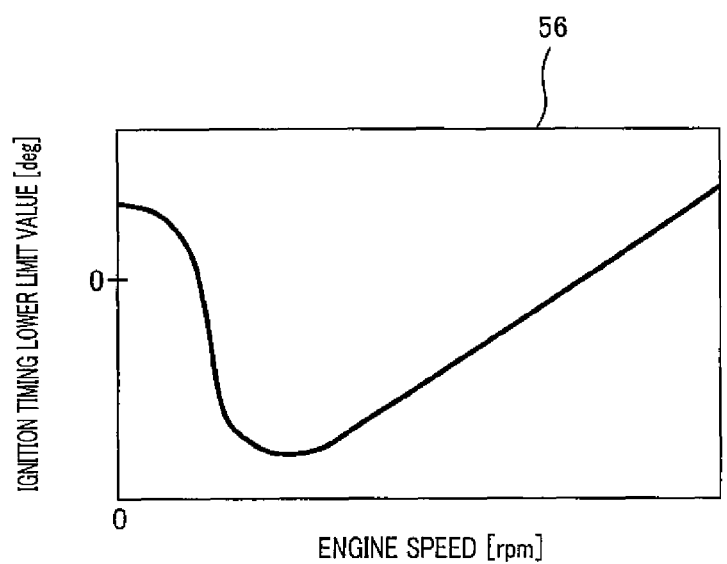
FIG. 34 is an ignition timing lower limit value map used for determining the lower limit value of the ignition timing.

FIG. 34 is an ignition timing lower limit value map used for determining the lower limit value of the ignition timing. In the above described embodiments, the control for retarding the ignition timing which is a parameter corresponding to the engine driving power is used. As shown in FIG. 34, a lower limit value map 56 for determining a retard angle limit (lower limit value) of the ignition lining may be pre-stored in the traction control unit 47. In the lower limit value map 56, the ignition timing lower limit value is set so as to gradually decrease so as to retard the ignition and then gradually increase so as to put forward the ignition as the engine speed increases. The reason why the ignition liming lower limit value is larger in the region where the engine speed is low is to prevent an engine stall which would be caused by an event in which the ignition retard angle amount increases and the driving power is reduced to excess. The reason why the ignition timing lower limit value is larger in the region where the engine speed is high is to prevent an event in which the ignition retard angle amount increases to excess and the driving speed fluctuates, degrading the driveability when the traction control is initiated.

The lower limit value map 56 may be applied to all vehicles so long as they use the ignition retard control. Whereas the lower limit value map 56 shown in FIG. 34 relates to the ignition timing, a lower limit value map of other parameters (e.g., throttle valve opening degree or a fuel feed amount) corresponding to the engine driving power may be used.

The present invention is applicable to general vehicles. For example, the present invention may be used with relatively light vehicles such as straddle-type vehicles, or with off-road vehicles which frequently drive over an off-road surface on which a slip is likely to occur. The driving power suppression amount at the initiation of the traction control may be changed based on a driving state just before the traction control is initiated. For example, the throttle valve target opening degree at the initiation of the traction control may be changed based on at least one of the throttle valve opening degree, the vehicle speed, and the engine speed of the vehicle. The driving power suppression amount may be reduced when at least one of the throttle valve opening degree and the vehicle speed is smaller than a predetermined set value when at least one of them is larger than the set value. To be specific, the amount of reduction of the throttle valve opening degree is lessened in high-speed driving than in low-speed driving. As a result, a fluctuation shock at the initiation of the traction control can be lessened during high-speed driving.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A slip suppression control system for a vehicle comprising:
   a monitored value detecting device for detecting a monitored value corresponding to a difference between a rotational speed of a front wheel of the vehicle and a rotational speed of a rear wheel of the vehicle;
   a threshold determiner unit configured to determine a relationship between the monitored value and at least one threshold; and
   a traction control unit configured to execute traction control including initial traction control and continued traction control executed continuously after the initial traction control, based on a determination of the threshold determiner unit;
   wherein the traction control unit is configured to initiate the initial traction control for reducing a driving power of a drive wheel when the threshold determiner unit determines that the monitored value exceeds a first slip threshold regardless of a difference between the monitored value and the first slip threshold at a start of slip;
   wherein the traction control unit is configured to execute the continued traction control such that the driving power is reduced when the threshold determiner unit determines that the monitored value exceeds a second slip threshold which is smaller than the first slip threshold, while the driving power is increased when the threshold determiner unit determines that the monitored value is smaller than the second slip threshold;
   wherein the traction control unit sets a parameter corresponding to the driving power at a predetermined constant value when the initial traction control is initiated, the predetermined constant value making the driving power smaller than does a value to which the parameter is set when executing the continued traction control; and
   wherein the traction control unit increases the parameter to increase the driving power at the beginning of the continued traction control.

2. The slip suppression control system for a vehicle according to claim 1, wherein
   the traction control unit is configured to execute feedback control of the driving power to cause the monitored value to be closer to the second slip threshold during the continued traction control.

3. The slip suppression control system for a vehicle according to claim 1, wherein
   the traction control unit is configured to reduce a reduction rate of the driving power when the threshold determiner unit determines that the monitored value is not larger than a driving power reduction suppression threshold which is smaller than the first slip threshold and is larger than a switching threshold.

4. The slip suppression control system for a vehicle according to claim 1, wherein
at least one of the first slip threshold and the second slip threshold is changed according to a driving state of the vehicle.

5. The slip suppression control system for a vehicle according to claim 1, wherein
at least one of the first slip threshold and the second slip threshold is changed according to a driver's operation.

6. The slip suppression control system for a vehicle according to claim 1, further comprising:
an engine which is a driving power generating source; and
an igniter for igniting in a cylinder of the engine;
wherein the traction control unit is configured to perform retard control of ignition timing of the igniter to reduce the driving power.

7. The slip suppression control system for a vehicle according to claim 1, further comprising:
an engine which is a driving power generating source; and
a throttle device configured to control an amount of air-intake supplied to the engine;
wherein the traction control unit is configured to control the throttle device to reduce the amount of air-intake to reduce the driving power.

8. The slip suppression control system for a vehicle according to claim 1, further comprising:
a brake for braking a drive wheel; and
a brake actuator for actuating the brake;
wherein the traction control unit is configured to control the brake actuator to activate the brake when the threshold determiner unit determines that the monitored value exceeds the first slip threshold.

9. The slip suppression control system for a vehicle according to claim 1, wherein
the traction control unit is configured to terminate the traction control to return the traction control to a normal control state when a predetermined restoration condition is satisfied; and
wherein the restoration condition is a condition that the driving power in a state where the traction control is being executed matches a driving power set in a normal control state.

10. The slip suppression control system for a vehicle according to claim 1, further comprising:
a vehicle speed sensor configured to detect a vehicle body speed, wherein
the threshold determiner unit is configured to change a threshold used in the continued traction control according to the vehicle body speed detected by the vehicle speed sensor.

11. The slip suppression control system for a vehicle according to claim 10,
wherein the threshold determiner unit is configured to set a larger threshold used in the continued traction control during a first, smaller vehicle speed detected by the vehicle speed sensor, and set a smaller threshold used in the continued traction control during a second, higher vehicle speed.

12. The slip suppression control system for a vehicle according to claim 1, further comprising:
a throttle valve opening degree sensor configured to detect an opening degree of a throttle valve for controlling an air-intake amount of an engine;
wherein the threshold determiner unit is configured to change a threshold used in the continued traction control according to a throttle valve opening degree detected by a throttle valve opening degree sensor.

13. The slip suppression control system for a vehicle according to claim 12, wherein the threshold determiner unit is configured to set a larger threshold used in the continued traction when a first throttle valve opening degree is detected by the throttle valve opening degree sensor, and set a smaller threshold used in the continued traction control when a second throttle valve opening degree is detected by the throttle valve opening degree sensor, and wherein the second throttle valve opening degree is larger than the first throttle valve opening degree.

14. The slip suppression control system for a vehicle according to claim 1, further comprising:
a throttle valve opening degree sensor configured to detect an opening degree of a throttle valve for controlling an air-intake amount of an engine;
wherein the traction control unit is configured to change a feedback gain in the continued traction control according to the throttle valve opening degree detected by the throttle valve opening degree sensor.

15. The slip suppression control system for a vehicle according to claim 1, further comprising:
an engine speed sensor configured to detect an engine speed of an engine;
wherein the traction control unit is configured to change a feedback gain in the continued traction control according to the engine speed detected by the engine speed sensor.

16. The slip suppression control system for a vehicle according to claim 1,
wherein the traction control unit contains a lower limit value map used for determining a lower limit value of the parameter corresponding to the driving power in a state where the traction control is being executed.

17. The slip suppression control system for a vehicle according to claim 16,
wherein the parameter is at least one of an ignition timing of an engine, a throttle valve opening degree, and a fuel feed amount.

18. The slip suppression control system for a vehicle according to claim 16,
wherein the lower limit value map is set so that the lower limit value of the parameter gradually decreases and then gradually increases as engine speed increases.

19. The slip suppression control system for a vehicle according to claim 1, further comprising:
an ignition control unit configured to control ignition timing in a cylinder of an engine of the vehicle; and
a fuel control unit configured to control an amount of fuel fed to the cylinder;
wherein the fuel control unit is configured to execute cylinder operation pause control in which feeding of the fuel to the cylinder is temporarily paused, when a state where a first condition including a condition that ignition timing is retarded is satisfied continues for a predetermined time or longer.

20. The slip suppression control system for a vehicle according to claim 19,
wherein a first condition includes a condition that ignition timing in a state where the traction control is being executed is retarded by a predetermined angle or larger with respect to the ignition timing in a normal control state where the traction control is not executed.

21. The slip suppression control system for a vehicle according to claim 19,
wherein the first condition includes a condition that an engine speed of the engine is a first predetermined value or higher.

22. The slip suppression control system for a vehicle according to claim 19,
wherein the fuel control unit is configured to terminate the cylinder operation pause control when a second condition including a condition that an engine speed of the engine is lower than a second predetermined value is satisfied in a state where the cylinder operation pause control is being executed.

23. The slip suppression control system for a vehicle according to claim 19,
wherein plural cylinders are provided;
and wherein the cylinder operation pause control is executed for a part of the plural cylinders.

24. The slip suppression control system for a vehicle according to claim 1,
wherein the traction control unit is configured to execute the continued traction control such that the driving power is reduced when the threshold determiner unit determines that the monitored value exceeds the second slip threshold, which is smaller than the first slip threshold; and
wherein the traction control unit is configured to execute the continued traction control such that the driving power is increased when the threshold determiner unit determines that the monitored value is smaller than a gripping threshold, which is equal to or less than the second slip threshold.

25. The slip suppression control system for a vehicle according to claim 24, wherein the gripping threshold is equal to the second slip threshold.

26. The slip suppression control system for a vehicle according to claim 1, wherein the predetermined constant value is a fixed value; and
wherein the traction control unit is configured to execute feedback control of the driving power to cause the monitored value to be closer to the second slip threshold during the continued traction control, the second slip threshold being smaller than the first slip threshold.

27. The slip suppression control system for a vehicle according to claim 1,
wherein the traction control unit is configured to execute the initial traction control when it is determined that a front wheel vehicle speed exceeds a predetermined front wheel vehicle speed threshold and the monitored value exceeds the first slip threshold,
wherein the first slip threshold is changed according to a driving state of the vehicle or a driver's operation.

28. The slip suppression control system for a vehicle according to claim 1, wherein a switching threshold is equal to the second slip threshold,
wherein the initial traction control is terminated and the continued traction control starts when it is determined that the monitored value becomes smaller than a switching threshold which is smaller than the first slip threshold, in a state where the initial traction control is being executed.

29. The slip suppression control system for a vehicle according to claim 1, wherein the continued traction control is terminated when a predetermined restoration condition including a condition that the parameter matches a parameter set in a normal control state is satisfied.

* * * * *